US012786032B2

(12) United States Patent
Gao et al.

(10) Patent No.: US 12,786,032 B2
(45) Date of Patent: Nov. 3, 2026

(54) WIRELESS COMMUNICATION METHOD AND APPARATUS

(71) Applicant: Huawei Technologies Co., Ltd., Shenzhen (CN)

(72) Inventors: Lei Gao, Beijing (CN); Xingqing Cheng, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 522 days.

(21) Appl. No.: 18/452,163

(22) Filed: Aug. 18, 2023

(65) Prior Publication Data

US 2023/0396480 A1 Dec. 7, 2023

Related U.S. Application Data

(63) Continuation of application No. PCT/CN2022/073103, filed on Jan. 21, 2022.

(30) Foreign Application Priority Data

Feb. 19, 2021 (CN) ......................... 202110192307.6

(51) Int. Cl.
*H04L 27/26* (2006.01)

(52) U.S. Cl.
CPC ........ *H04L 27/2655* (2013.01); *H04L 27/261* (2013.01)

(58) Field of Classification Search
CPC ............... H04L 27/261; H04L 27/2613; H04L 27/2655; H04L 27/2657; H04L 27/2675; H04L 5/0048; H04L 5/0007; H04W 56/001; H04W 56/0015
See application file for complete search history.

(56) References Cited

U.S. PATENT DOCUMENTS 7,453,793 B1 * 11/2008 Jones, IV ............ H04L 25/0232 455/63.1
2015/0029962 A1 1/2015 Yun et al.
2016/0050677 A1 2/2016 Cheng et al.
2018/0167946 A1 6/2018 Si et al.
2018/0248642 A1 8/2018 Si et al.
(Continued)

FOREIGN PATENT DOCUMENTS

CN 102696193 A 9/2012
CN 108270714 A 7/2018
(Continued)

*Primary Examiner* — Asad M Nawaz
*Assistant Examiner* — Natali Pascual Peguero
(74) *Attorney, Agent, or Firm* — Conley Rose, P.C.

(57) ABSTRACT

A wireless communication method includes: mapping a first reference signal to preamble information, where the preamble information sequentially includes a first synchronization sequence group part, a first part, a second synchronization sequence group part, and a second part in time domain, a length of the first part in time domain is fixed, the first synchronization sequence group part, the first part, the second synchronization sequence group part, and the second part each include at least one OFDM symbol, and the first reference signal is mapped to K subcarriers in subcarriers corresponding to at least one OFDM symbol included in the first part and/or the second part, where K is a positive integer; and sending the preamble information.

20 Claims, 7 Drawing Sheets

(56) References Cited

U.S. PATENT DOCUMENTS

| | | | |
|---|---|---|---|
| 2018/0368092 | A1 | 12/2018 | Wang et al. |
| 2019/0081761 | A1* | 3/2019 | Liu ......................... H04L 5/005 |
| 2019/0150190 | A1 | 5/2019 | Kim et al. |
| 2020/0099564 | A1 | 3/2020 | Axnas et al. |
| 2020/0137792 | A1* | 4/2020 | Yoon ..................... H04L 5/0041 |
| 2020/0187190 | A1 | 6/2020 | Gao et al. |
| 2020/0328872 | A1 | 10/2020 | Shi et al. |

FOREIGN PATENT DOCUMENTS

| | | | |
|---|---|---|---|
| CN | 109412764 | A | 3/2019 |
| CN | 110050420 | A | 7/2019 |
| CN | 110268649 | A | 9/2019 |
| CN | 111602349 | B | 10/2021 |
| EP | 3425825 | A1 | 1/2019 |
| EP | 3471496 | A1 | 4/2019 |
| JP | 2019508989 | A | 3/2019 |
| JP | 2019522942 | A | 8/2019 |
| JP | 2020508614 | A | 3/2020 |

* cited by examiner (a)

(b)

WIRELESS COMMUNICATION METHOD AND APPARATUS

CROSS-REFERENCE TO RELATED APPLICATIONS

This is a continuation of Int'l Patent App. No. PCT/CN2022/073103, filed on Jan. 21, 2022, which claims priority to Chinese Patent App. No. 202110192307.6, filed on Feb. 19, 2021, both of which are incorporated by reference.

FIELD

This disclosure relates to the communication field, and in particular, to a wireless communication method and apparatus.

BACKGROUND

Diversification of in-vehicle applications leads to an increasing quantity and more types of in-vehicle communication nodes, and imposes a higher requirement on an in-vehicle communication capability. Compared with wired communication, in-vehicle wireless communication can further reduce a quantity, lengths, and weights of harnesses in a vehicle, and corresponding installation and maintenance costs. Therefore, an in-vehicle communication technology is gradually becoming wireless.

For in-vehicle communication, there are a plurality of communication domains. Each communication domain includes one master node and at least one slave node. The master node schedules the slave node, and data transmission between the master node and the slave node is implemented by using a superframe.

In in-vehicle short-range communication, a multi-domain resource multiplexing method in which a plurality of communication domains compete for resources is supported, and master nodes corresponding to the plurality of communication domains compete with each other to preempt a channel. Before the data transmission between the master node and the slave node is implemented, the master node transmits preamble information to the slave node, where the preamble information is used by the slave node to identify a communication domain that occupies a channel, synchronize the master node with the slave node, and assist a slave node that does not access the communication domain in quickly obtaining system information to access the channel as soon as possible.

In a low signal-to-noise ratio environment, precision of clock frequency synchronization between the master node and the slave node is insufficient, and therefore data transmission between the master node and the slave node cannot be implemented. Therefore, how to obtain sufficient synchronization precision in a low signal-to-noise ratio scenario is an urgent problem to be resolved.

SUMMARY

This disclosure provides a wireless communication method and apparatus, to improve precision of frequency synchronization between a master node and a slave node, so that data transmission between the master node and the slave node is implemented.

According to a first aspect, a wireless communication method is provided. The wireless communication method includes: mapping a first reference signal to preamble information, where the preamble information sequentially includes a first synchronization sequence group part, a first part, a second synchronization sequence group part, and a second part in time domain, a length of the first part in time domain is fixed, the first synchronization sequence group part, the first part, the second synchronization sequence group part, and the second part each include at least one orthogonal frequency division multiplexing OFDM symbol, and the first reference signal is mapped to K subcarriers in subcarriers corresponding to at least one OFDM symbol included in the first part and/or the second part, where K is a positive integer; and sending the preamble information.

In the technical solution of this embodiment, the first reference signal is mapped to the K subcarriers in the subcarriers corresponding to the at least one OFDM symbol included in the first part and/or the second part. A receive end estimates a residual frequency offset by using the first reference signal. In this way, channel phase adjustment and clock synchronization are implemented at the receive end, and precision of clock synchronization between a transmit end and the receive end is improved, so that a slave node reads signaling content carried in the preamble information, and data transmission between the master node and the slave node is implemented.

With reference to the first aspect, in some implementations of the first aspect, the first reference signal is mapped to an $11^{th}$ subcarrier and/or a $31^{st}$ subcarrier in the subcarriers corresponding to the at least one OFDM symbol included in the first part; and/or the first reference signal is mapped to an $11^{th}$ subcarrier and/or a $31^{st}$ subcarrier in the subcarriers corresponding to the at least one OFDM symbol included in the second part.

In some possible implementations, a value of K may be related to at least one of the following parameters: a total quantity of subcarriers corresponding to the at least one OFDM symbol, channel quality, or a size of data carried in the first part.

In some possible implementations, positions of the K subcarriers may be related to at least one of the following parameters: a total quantity of subcarriers of the at least one OFDM symbol, channel quality, and a value of K.

In some possible implementations, when the value of K is greater than or equal to 2, each of the K subcarriers is separated by M subcarriers, where M is greater than or equal to 1, and a value of M may be related to at least one of the following parameters: a total quantity of subcarriers corresponding to the at least one OFDM symbol, the value of K, and a subcarrier frequency band corresponding to the at least one OFDM symbol.

In the technical solution of this embodiment, a position of the subcarrier to which the first reference signal is mapped is far away from a carrier edge in frequency domain, so that impact of adjacent-channel interference on the first reference signal can be reduced. In addition, when the value of K is greater than or equal to 2, and each subcarrier to which the first reference signal is mapped is separated by the M subcarriers, a frequency diversity gain may be obtained, so as to avoid poor frequency offset estimation performance because two neighboring subcarriers to which the first reference signal is mapped are located in a same deep attenuation part of a frequency domain channel.

With reference to the first aspect, in some implementations of the first aspect, the method includes: mapping a first synchronization sequence to at least one OFDM symbol in the first synchronization sequence group part, where the first synchronization sequence includes a first complex number, and/or mapping a first synchronization sequence to at least one OFDM symbol in the second synchronization sequence group part, where the first synchronization sequence includes a second complex number.

With reference to the first aspect, in some implementations of the first aspect, the first complex number is mapped to an $N^{th}$ subcarrier corresponding to the at least one OFDM symbol in the first synchronization sequence group part; and/or the second complex number is mapped to an $N^{th}$ subcarrier corresponding to the at least one OFDM symbol in the second synchronization sequence group part. The first reference signal includes a third complex number, and the third complex number is mapped to an $N^{th}$ subcarrier corresponding to the at least one OFDM symbol in the first part and/or the second part. The third complex number is equal to the first complex number, or the third complex number is equal to the second complex number, or the first complex number, the second complex number, and the third complex number are equal.

In the technical solution of this embodiment, when the third complex number is equal to the first complex number, or when the third complex number is equal to the second complex number, implementation complexity of calculating a residual frequency offset by the receive end can be reduced.

With reference to the first aspect, in some implementations of the first aspect, the first reference signal is mapped to the K subcarriers in subcarriers corresponding to each OFDM symbol included in the first part and/or the second part, where K is a positive integer.

In the technical solution of this embodiment, when the first reference signal is mapped to the K subcarriers in the subcarriers corresponding to each OFDM symbol included in the first part and/or the second part, the receive end may obtain more equations used to calculate the residual frequency offset. In this way, a more accurate residual frequency offset is estimated, and sufficient synchronization precision is obtained in a low signal-to-noise ratio scenario, so that the slave node reads the signaling content carried in the preamble information, and data transmission between the master node and the slave node is implemented.

In some possible implementations, the first reference signal may be mapped to K subcarriers in subcarriers corresponding to at least one CP-OFDM symbol included in the first part and/or the second part.

In the technical solution of this embodiment, because a time interval of a CP-OFDM symbol is larger than that of an OFDM symbol that does not include a cyclic prefix, the first reference signal is mapped to the CP-OFDM symbol, so that the receive end estimates a more accurate residual frequency offset, and frequency synchronization precision is improved.

In some possible implementations, the first reference signal may be mapped to K subcarriers in subcarriers corresponding to at least one CP-OFDM symbol included in the first part and/or the second part, where the CP-OFDM symbol uses an extended cyclic prefix.

In the technical solution of this embodiment, because the CP-OFDM symbol to which the first reference signal is mapped uses an extended cyclic prefix, a time length of the CP-OFDM symbol of this type is greater than that of a CP-OFDM symbol using a regular cyclic prefix. Therefore, the first reference signal is mapped to the CP-OFDM symbol using the extended cyclic prefix, so that the receive end estimates a more accurate residual frequency offset, and frequency synchronization precision is further improved.

With reference to the first aspect, in some implementations of the first aspect, a length of the second part in time domain is variable.

With reference to the first aspect, in some implementations of the first aspect, the first part indicates length information of the second part.

According to a second aspect, a wireless communication method is provided. The wireless communication method includes: receiving preamble information, where the preamble information sequentially includes a first synchronization sequence group part, a first part, a second synchronization sequence group part, and a second part in time domain, a length of the first part in time domain is fixed, the first synchronization sequence group part, the first part, the second synchronization sequence group part, and the second part each include at least one OFDM symbol, and the first reference signal is mapped to K subcarriers in subcarriers corresponding to at least one OFDM symbol included in the first part and/or the second part, where K is a positive integer; and obtaining the first reference signal.

In the technical solution of this embodiment, the first reference signal is mapped to the K subcarriers in the subcarriers corresponding to the at least one OFDM symbol included in the first part and/or the second part. A receive end calculates a residual frequency offset by using the first reference signal. In this way, channel phase adjustment and clock synchronization are implemented at the receive end, and precision of clock synchronization between a transmit end and the receive end is improved, so that a slave node reads signaling content carried in the preamble information, and data transmission between the master node and the slave node is implemented.

With reference to the second aspect, in some implementations of the second aspect, the first reference signal is mapped to an $11^{th}$ subcarrier and/or a $31^{st}$ subcarrier in the subcarriers corresponding to the at least one OFDM symbol included in the first part; and/or the first reference signal is mapped to an $11^{th}$ subcarrier and/or a $31^{st}$ subcarrier in the subcarriers corresponding to the at least one OFDM symbol included in the second part.

In some possible implementations, a value of K may be related to at least one of the following parameters: a total quantity of subcarriers corresponding to the at least one OFDM symbol, channel quality, or a size of data carried in the first part.

In some possible implementations, positions of the K subcarriers may be related to at least one of the following parameters: a total quantity of subcarriers of the at least one OFDM symbol, channel quality, and a value of K.

In some possible implementations, when a value of K is greater than or equal to 2, each of the K subcarriers is separated by M subcarriers, where M is greater than or equal to 1, and a value of M may be related to at least one of the following parameters: a total quantity of subcarriers corresponding to the at least one OFDM symbol, the value of K, and a subcarrier frequency band corresponding to the at least one OFDM symbol.

In the technical solution of this embodiment, a position of the subcarrier to which the first reference signal is mapped is far away from a carrier edge in frequency domain, so that impact of adjacent-channel interference on the first reference signal can be reduced. In addition, when the value of K is greater than or equal to 2, and each subcarrier to which the first reference signal is mapped is separated by the M subcarriers, a frequency diversity gain may be obtained, so as to avoid poor frequency offset estimation performance because two neighboring subcarriers to which the first reference signal is mapped are located in a same deep attenuation part of a frequency domain channel.

With reference to the second aspect, in some implementations of the second aspect, a first synchronization sequence is mapped to at least one OFDM symbol in the first synchronization sequence group part, where the first synchronization sequence includes a first complex number; and/or a first synchronization sequence is mapped to at least one OFDM symbol in the second synchronization sequence group part, where the first synchronization sequence includes a second complex number.

With reference to the second aspect, in some implementations of the second aspect, the first complex number is mapped to an $N^{th}$ subcarrier corresponding to the at least one OFDM symbol in the first synchronization sequence group part; and/or the second complex number is mapped to an $N^{th}$ subcarrier corresponding to the at least one OFDM symbol in the second synchronization sequence group part. The first reference signal includes a third complex number, and the third complex number is mapped to an $N^{th}$ subcarrier corresponding to the at least one OFDM symbol in the first part and/or the second part. The third complex number is equal to the first complex number, or the third complex number is equal to the second complex number, or the first complex number, the second complex number, and the third complex number are equal.

In the technical solution of this embodiment, when the third complex number is equal to the first complex number, or when the third complex number is equal to the second complex number, implementation complexity of calculating a residual frequency offset by the receive end can be reduced.

With reference to the second aspect, in some implementations of the second aspect, the first reference signal is mapped to the K subcarriers in subcarriers corresponding to each OFDM symbol included in the first part and/or the second part, where K is a positive integer.

In the technical solution of this embodiment, when the first reference signal is mapped to the K subcarriers in the subcarriers corresponding to each OFDM symbol included in the first part and/or the second part, the receive end may obtain more equations used to calculate the residual frequency offset. In this way, a more accurate residual frequency offset is estimated, and sufficient synchronization precision is obtained in a low signal-to-noise ratio scenario, so that the slave node reads the signaling content carried in the preamble information, and data transmission between the master node and the slave node is implemented.

In some possible implementations, the first reference signal may be mapped to K subcarriers in subcarriers corresponding to at least one CP-OFDM symbol included in the first part and/or the second part.

In the technical solution of this embodiment, because a symbol time interval of a CP-OFDM symbol is larger than a symbol time interval of an OFDM symbol that does not include a cyclic prefix, the first reference signal is mapped to the CP-OFDM symbol, so that the receive end estimates a more accurate residual frequency offset, and frequency synchronization precision is improved.

In some possible implementations, the first reference signal may be mapped to K subcarriers in subcarriers corresponding to at least one CP-OFDM symbol included in the first part and/or the second part, where the CP-OFDM symbol uses an extended cyclic prefix.

In the technical solution of this embodiment, because the CP-OFDM symbol to which the first reference signal is mapped uses an extended cyclic prefix, a time length of the CP-OFDM symbol of this type is greater than that of a CP-OFDM symbol using a regular cyclic prefix. Therefore, the first reference signal is mapped to the CP-OFDM symbol using the extended cyclic prefix, so that the receive end estimates a more accurate residual frequency offset, and frequency synchronization precision is further improved.

With reference to the second aspect, in some implementations of the second aspect, a length of the second part in time domain is variable.

With reference to the second aspect, in some implementations of the second aspect, the first part indicates length information of the second part.

With reference to the second aspect, in some implementations of the second aspect, synchronization is performed based on the first synchronization sequence group part or the second synchronization sequence group part.

With reference to the second aspect, in some implementations of the second aspect, a first synchronization sequence is mapped to at least one OFDM symbol in the first synchronization sequence group part, where the first synchronization sequence includes a first complex number; and/or a first synchronization sequence is mapped to at least one OFDM symbol in the second synchronization sequence group part, where the first synchronization sequence includes a second complex number. The first reference signal includes a third complex number, and the third complex number is mapped to an $N^{th}$ subcarrier corresponding to the at least one OFDM symbol in the first part and/or the second part. The method includes: performing synchronization based on the first complex number and the third complex number; or performing synchronization based on the second complex number and the third complex number; or performing synchronization based on the first complex number, the second complex number, and the third complex number.

In the technical solution of this embodiment, a transmit end maps the first reference signal to the subcarrier corresponding to the at least one OFDM symbol included in the first part or the second part in the preamble information, so that the receive end can estimate, in a low signal-to-noise ratio scenario, a residual frequency offset after the transmit end and the receive end perform clock synchronization by using the first synchronization sequence group part or the second synchronization sequence group part, so as to improve frequency synchronization precision during clock synchronization between the transmit end and the receive end, so that in the low signal-to-noise ratio scenario, sufficient synchronization precision is obtained, the slave node reads signaling content carried in the preamble information, and data transmission between the master node and the slave node is implemented.

In the technical solution of this embodiment, a larger quantity of equations combined with the third complex number and the first complex number, and the third complex number and the second complex number indicates a larger quantity of equations used for estimating the residual frequency offset, so that residual frequency offset estimation precision can be further improved. In this way, frequency synchronization precision is improved during clock synchronization between the transmit end and the receive end, so that sufficient synchronization precision is obtained in the low signal-to-noise ratio scenario, the slave node reads signaling content carried in the preamble information, and data transmission between the master node and the slave node is implemented.

In some possible implementations, when a transmit end maps the first reference signal to K subcarriers in subcarriers corresponding to at least one OFDM symbol included in the first part and/or the second part, and a value of K is greater than or equal to 2, the receive end estimates a residual frequency offset based on the first complex number and the third complex number, or the second complex number and the third complex number, or the first complex number, the second complex number, and the third complex number that are received on the $N^{th}$ subcarrier.

In the technical solution of this embodiment, when the first reference signal is mapped to the K subcarriers, and a value of K is greater than or equal to 2, more residual frequency offset estimation equations are obtained, so that residual frequency offset estimation precision can be further improved. In this way, frequency synchronization precision is improved during clock synchronization between the transmit end and the receive end, so that sufficient synchronization precision is obtained in a low signal-to-noise ratio scenario, the slave node reads signaling content carried in the preamble information, and data transmission between the master node and the slave node is implemented.

According to a third aspect, a wireless communication apparatus is provided, including a mapping module and a sending module. The mapping module is configured to map a first reference signal to preamble information, where the preamble information sequentially includes a first synchronization sequence group part, a first part, a second synchronization sequence group part, and a second part in time domain, a length of the first part in time domain is fixed, the first synchronization sequence group part, the first part, the second synchronization sequence group part, and the second part each include at least one orthogonal frequency division multiplexing OFDM symbol, and the first reference signal is mapped to K subcarriers in subcarriers corresponding to at least one OFDM symbol included in the first part and/or the second part, where K is a positive integer. The sending module is configured to send the preamble information.

In the technical solution of this embodiment, the first reference signal is mapped to the K subcarriers in the subcarriers corresponding to the at least one OFDM symbol included in the first part and/or the second part. A receive end calculates a residual frequency offset by using the first reference signal. In this way, channel phase adjustment and clock synchronization are implemented at the receive end, and precision of clock synchronization between a transmit end and the receive end is improved, so that a slave node reads signaling content carried in the preamble information, and data transmission between the master node and the slave node is implemented.

With reference to the third aspect, in some implementations of the third aspect, the mapping module is configured to map the first reference signal to an $11^{th}$ subcarrier and/or a $31^{st}$ subcarrier in the subcarriers corresponding to the at least one OFDM symbol included in the first part; and/or the mapping module is configured to map the first reference signal to an $11^{th}$ subcarrier and/or a $31^{st}$ subcarrier in the subcarriers corresponding to the at least one OFDM symbol included in the second part.

In some possible implementations, a value of K may be related to at least one of the following parameters: a total quantity of subcarriers corresponding to the at least one OFDM symbol, channel quality, or a size of data carried in the first part.

In some possible implementations, positions of the K subcarriers may be related to at least one of the following parameters: a total quantity of subcarriers of the at least one OFDM symbol, channel quality, and a value of K.

In some possible implementations, when a value of K is greater than or equal to 2, each of the K subcarriers is separated by M subcarriers, where M is greater than or equal to 1, and a value of M may be related to at least one of the following parameters: a total quantity of subcarriers corresponding to the at least one OFDM symbol, the value of K, and a subcarrier frequency band corresponding to the at least one OFDM symbol.

In the technical solution of this embodiment, a position of the subcarrier to which the first reference signal is mapped is far away from a carrier edge in frequency domain, so that impact of adjacent-channel interference on the first reference signal can be reduced. In addition, when the value of K is greater than or equal to 2, and each subcarrier to which the first reference signal is mapped is separated by the M subcarriers, a frequency diversity gain may be obtained, so as to avoid poor frequency offset estimation performance because two neighboring subcarriers to which the first reference signal is mapped are located in a same deep attenuation part of a frequency domain channel.

With reference to the third aspect, in some implementations of the third aspect, the mapping module maps a first synchronization sequence to at least one OFDM symbol in the first synchronization sequence group part, where the first synchronization sequence includes a first complex number, and/or the mapping module maps a first synchronization sequence to at least one OFDM symbol in the second synchronization sequence group part, where the first synchronization sequence includes a second complex number.

With reference to the third aspect, in some implementations of the third aspect, the first complex number is mapped to an $N^{th}$ subcarrier corresponding to the at least one OFDM symbol in the first synchronization sequence group part; and/or the second complex number is mapped to an $N^{th}$ subcarrier corresponding to the at least one OFDM symbol in the second synchronization sequence group part. The first reference signal includes a third complex number, and the third complex number is mapped to an $N^{th}$ subcarrier corresponding to the at least one OFDM symbol in the first part and/or the second part. The third complex number is equal to the first complex number, or the third complex number is equal to the second complex number, or the first complex number, the second complex number, and the third complex number are equal.

In the technical solution of this embodiment, when the third complex number is equal to the first complex number, or when the third complex number is equal to the second complex number, implementation complexity of calculating a residual frequency offset by the receive end can be reduced.

With reference to the third aspect, in some implementations of the third aspect, the first reference signal is mapped to the K subcarriers in subcarriers corresponding to each OFDM symbol included in the first part and/or the second part, where K is a positive integer.

In the technical solution of this embodiment, when the first reference signal is mapped to the K subcarriers in the subcarriers corresponding to each OFDM symbol included in the first part and/or the second part, the receive end may obtain more equations used to calculate the residual frequency offset. In this way, a more accurate residual frequency offset is estimated, and sufficient synchronization precision is obtained in a low signal-to-noise ratio scenario, so that the slave node reads the signaling content carried in the preamble information, and data transmission between the master node and the slave node is implemented.

In some possible implementations, the first reference signal may be mapped to K subcarriers in subcarriers corresponding to at least one CP-OFDM symbol included in the first part and/or the second part.

In the technical solution of this embodiment, because a symbol time interval of a CP-OFDM symbol is larger than a symbol time interval of an OFDM symbol that does not include a cyclic prefix, the first reference signal is mapped to the CP-OFDM symbol, so that the receive end estimates a more accurate residual frequency offset, and frequency synchronization precision is improved.

In some possible implementations, the first reference signal may be mapped to K subcarriers in subcarriers corresponding to at least one CP-OFDM symbol included in the first part and/or the second part, where the CP-OFDM symbol uses an extended cyclic prefix.

In the technical solution of this embodiment, because the CP-OFDM symbol to which the first reference signal is mapped uses an extended cyclic prefix, a time length of the CP-OFDM symbol of this type is greater than that of a CP-OFDM symbol using a regular cyclic prefix. Therefore, the first reference signal is mapped to the CP-OFDM symbol using the extended cyclic prefix, so that a receive end estimates a more accurate residual frequency offset, and frequency synchronization precision is further improved.

With reference to the third aspect, in some implementations of the third aspect, a length of the second part in time domain is variable.

With reference to the third aspect, in some implementations of the third aspect, the first part indicates length information of the second part.

According to a fourth aspect, a wireless communication apparatus is provided, including a receiving module and an obtaining module. The receiving module is configured to receive preamble information, where the preamble information sequentially includes a first synchronization sequence group part, a first part, a second synchronization sequence group part, and a second part in time domain, a length of the first part in time domain is fixed, the first synchronization sequence group part, the first part, the second synchronization sequence group part, and the second part each include at least one OFDM symbol, and the first reference signal is mapped to K subcarriers in subcarriers corresponding to at least one OFDM symbol included in the first part and/or the second part, where K is a positive integer. The obtaining module is configured to obtain the first reference signal.

In the technical solution of this embodiment, the first reference signal is mapped to the K subcarriers in the subcarriers corresponding to the at least one OFDM symbol included in the first part and/or the second part. A receive end calculates a residual frequency offset by using the first reference signal. In this way, channel phase adjustment and clock synchronization are implemented at the receive end, and precision of clock synchronization between a transmit end and the receive end is improved, so that a slave node reads signaling content carried in the preamble information, and data transmission between the master node and the slave node is implemented.

With reference to the fourth aspect, in some implementations of the fourth aspect, the first reference signal is mapped to an $11^{th}$ subcarrier and/or a $31^{st}$ subcarrier in the subcarriers corresponding to the at least one OFDM symbol included in the first part; and/or the first reference signal is mapped to an $11^{th}$ subcarrier and/or a $31^{st}$ subcarrier in the subcarriers corresponding to the at least one OFDM symbol included in the second part.

In some possible implementations, a value of K may be related to at least one of the following parameters: a total quantity of subcarriers corresponding to the at least one OFDM symbol, channel quality, or a size of data carried in the first part.

In some possible implementations, positions of the K subcarriers may be related to at least one of the following parameters: a total quantity of subcarriers of the at least one OFDM symbol, channel quality, and a value of K.

In some possible implementations, when a value of K is greater than or equal to 2, each of the K subcarriers is separated by M subcarriers, where M is greater than or equal to 1, and a value of M may be related to at least one of the following parameters: a total quantity of subcarriers corresponding to the at least one OFDM symbol, the value of K, and a subcarrier frequency band corresponding to the at least one OFDM symbol.

In the technical solution of this embodiment, a position of the subcarrier to which the first reference signal is mapped is far away from a carrier edge in frequency domain, so that impact of adjacent-channel interference on the first reference signal can be reduced. In addition, when the value of K is greater than or equal to 2, and each subcarrier to which the first reference signal is mapped is separated by the M subcarriers, a frequency diversity gain may be obtained, so as to avoid poor frequency offset estimation performance because two neighboring subcarriers to which the first reference signal is mapped are located in a same deep attenuation part of a frequency domain channel.

With reference to the fourth aspect, in some implementations of the fourth aspect, the obtaining module is configured to obtain a first synchronization sequence, where the first synchronization sequence is mapped to at least one OFDM symbol in the first synchronization sequence group part, and the first synchronization sequence includes a first complex number; and/or the first synchronization sequence is mapped to at least one OFDM symbol in the second synchronization sequence group part, and the first synchronization sequence includes a second complex number.

With reference to the fourth aspect, in some implementations of the fourth aspect, the first complex number is mapped to an $N^{th}$ subcarrier corresponding to the at least one OFDM symbol in the first synchronization sequence group part; and/or the second complex number is mapped to an $N^{th}$ subcarrier corresponding to the at least one OFDM symbol in the second synchronization sequence group part. The first reference signal includes a third complex number, and the third complex number is mapped to an $N^{th}$ subcarrier corresponding to the at least one OFDM symbol in the first part and/or the second part. The third complex number is equal to the first complex number, or the third complex number is equal to the second complex number, or the first complex number, the second complex number, and the third complex number are equal.

In the technical solution of this embodiment, when the third complex number is equal to the first complex number, or when the third complex number is equal to the second complex number, implementation complexity of calculating a residual frequency offset by a receive end can be reduced.

With reference to the fourth aspect, in some implementations of the fourth aspect, the first reference signal is mapped to the K subcarriers in subcarriers corresponding to each OFDM symbol included in the first part and/or the second part, where K is a positive integer.

In the technical solution of this embodiment, when the first reference signal is mapped to the K subcarriers in the subcarriers corresponding to each OFDM symbol included in the first part and/or the second part, the receive end may obtain more equations used to calculate the residual frequency offset. In this way, a more accurate residual frequency offset is estimated, and sufficient synchronization precision is obtained in a low signal-to-noise ratio scenario, so that the slave node reads the signaling content carried in the preamble information, and data transmission between the master node and the slave node is implemented.

In some possible implementations, the first reference signal may be mapped to K subcarriers in subcarriers corresponding to at least one CP-OFDM symbol included in the first part and/or the second part.

In the technical solution of this embodiment, because a symbol time interval of a CP-OFDM symbol is larger than a symbol time interval of an OFDM symbol that does not include a cyclic prefix, the first reference signal is mapped to the CP-OFDM symbol, so that a receive end estimates a more accurate residual frequency offset, and frequency synchronization precision is improved.

In some possible implementations, the first reference signal may be mapped to K subcarriers in subcarriers corresponding to at least one CP-OFDM symbol included in the first part and/or the second part, where the CP-OFDM symbol uses an extended cyclic prefix.

In the technical solution of this embodiment, because the CP-OFDM symbol to which the first reference signal is mapped uses an extended cyclic prefix, a time length of the CP-OFDM symbol of this type is greater than that of a CP-OFDM symbol using a regular cyclic prefix. Therefore, the first reference signal is mapped to the CP-OFDM symbol using the extended cyclic prefix, so that a receive end estimates a more accurate residual frequency offset, and frequency synchronization precision is further improved.

With reference to the fourth aspect, in some implementations of the fourth aspect, a length of the second part in time domain is variable.

With reference to the fourth aspect, in some implementations of the fourth aspect, the first part indicates length information of the second part.

With reference to the fourth aspect, in some implementations of the fourth aspect, the apparatus further includes a processing module, and the processing module is configured to perform synchronization based on the first synchronization sequence group part or the second synchronization sequence group part.

With reference to the fourth aspect, in some implementations of the fourth aspect, a first synchronization sequence is mapped to at least one OFDM symbol in the first synchronization sequence group part, where the first synchronization sequence includes a first complex number; and/or a first synchronization sequence is mapped to at least one OFDM symbol in the second synchronization sequence group part, where the first synchronization sequence includes a second complex number. The first reference signal includes a third complex number, and the third complex number is mapped to an $N^{th}$ subcarrier corresponding to the at least one OFDM symbol in the first part and/or the second part. The processing module is further configured to: perform synchronization based on the first complex number and the third complex number; or perform synchronization based on the second complex number and the third complex number; or perform synchronization based on the first complex number, the second complex number, and the third complex number.

In the technical solution of this embodiment, a transmit end maps the first reference signal to the subcarrier corresponding to the at least one OFDM symbol included in the first part or the second part in the preamble information, so that a receive end can estimate, in a low signal-to-noise ratio scenario, a residual frequency offset after the transmit end and the receive end perform clock synchronization by using the first synchronization sequence group part or the second synchronization sequence group part, so as to improve frequency synchronization precision during clock synchronization between the transmit end and the receive end, so that in the low signal-to-noise ratio scenario, sufficient synchronization precision is obtained, the slave node reads signaling content carried in the preamble information, and data transmission between the master node and the slave node is implemented.

In the technical solution of this embodiment, a larger quantity of equations combined with the third complex number and the first complex number, and the third complex number and the second complex number indicates a larger quantity of equations used for estimating the residual frequency offset, so that residual frequency offset estimation precision can be further improved. In this way, frequency synchronization precision is improved during clock synchronization between the transmit end and the receive end, so that sufficient synchronization precision is obtained in the low signal-to-noise ratio scenario, the slave node reads signaling content carried in the preamble information, and data transmission between the master node and the slave node is implemented.

In some possible implementations, when a transmit end maps the first reference signal to K subcarriers in subcarriers corresponding to at least one OFDM symbol included in the first part and/or the second part, and a value of K is greater than or equal to 2, a receive end estimates a residual frequency offset based on the first complex number and the third complex number, or the second complex number and the third complex number, or the first complex number, the second complex number, and the third complex number that are received on the $N^{th}$ subcarrier.

In the technical solution of this embodiment, when the first reference signal is mapped to the K subcarriers, and a value of K is greater than or equal to 2, more residual frequency offset estimation equations are obtained, so that residual frequency offset estimation precision can be further improved. In this way, frequency synchronization precision is improved during clock synchronization between the transmit end and the receive end, so that sufficient synchronization precision is obtained in a low signal-to-noise ratio scenario, the slave node reads signaling content carried in the preamble information, and data transmission between the master node and the slave node is implemented.

According to a fifth aspect, a computer-readable medium is configured to store a computer program. The computer program includes instructions used to perform the method according to any one of the first aspect or the possible implementations of the first aspect, or instructions used to perform the method according to any one of the second aspect or the possible implementations of the second aspect.

According to a sixth aspect, a chip is provided, and may include a processor and a data interface. The processor invokes a computer program from a memory by using the data interface and runs the computer program, so that a device on which the chip is installed performs instructions of the method according to any one of the first aspect or the possible implementations of the first aspect, or a device on which the chip is installed performs instructions of the method according to any one of the second aspect or the possible implementations of the second aspect.

According to a seventh aspect, a vehicle is provided, including the apparatus according to any one of the third aspect or the possible implementations of the third aspect, or the apparatus according to any one of the fourth aspect or the possible implementations of the fourth aspect.

DETAILED DESCRIPTION

Figure 1:
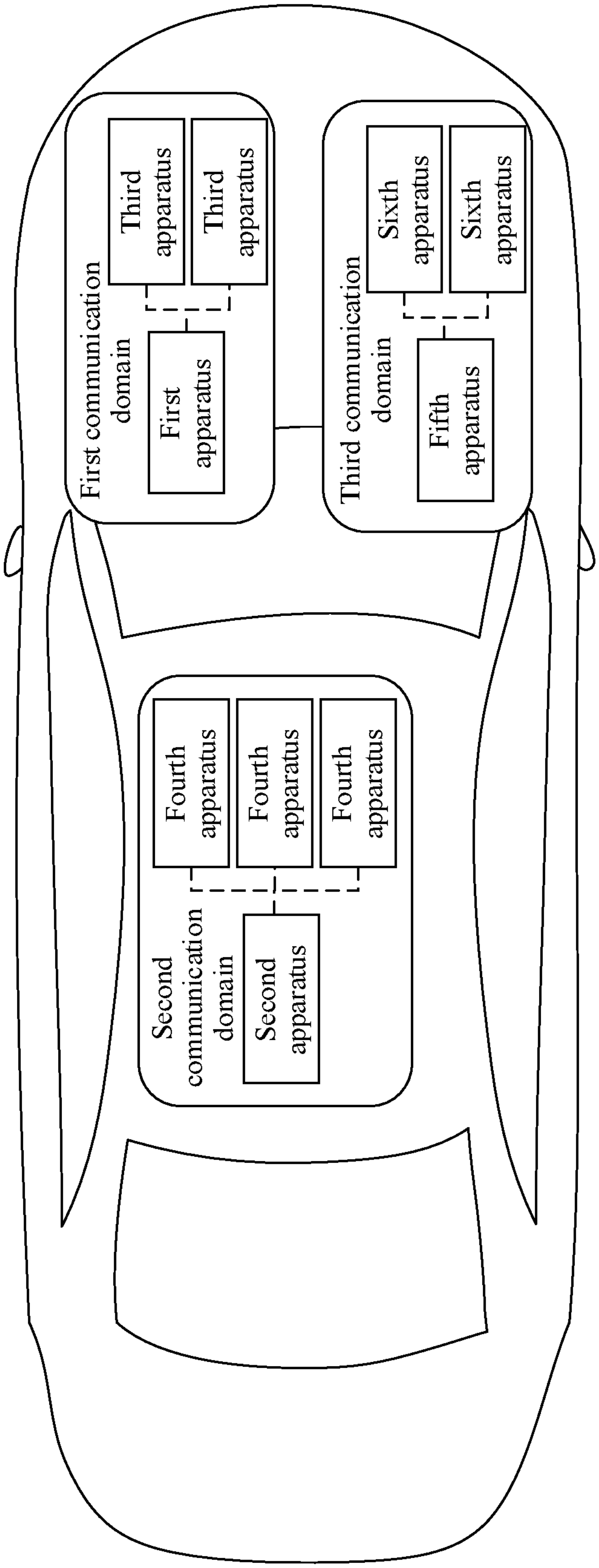
FIG. 1 is a schematic diagram of a scenario architecture of a communication method according to an embodiment.

The following describes technical solutions with reference to accompanying drawings.

In the specification, claims, and accompanying drawings, the terms "first", "second", "third", "fourth", and so on (if existent) are intended to distinguish between similar objects but do not necessarily indicate a specific order or sequence. It should be understood that the data termed in such a way are interchangeable in proper circumstances so that embodiments described herein can be implemented in other orders than the order illustrated or described herein. In addition, the terms "include" and "have" and any other variants are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

The following first explains some terms to facilitate understanding by a person skilled in the art.

(1) CDC: cockpit domain controller or control domain cockpit. The cockpit domain controller is referred to as head unit for short. In addition to conventional radio, music and video playing, and navigation functions, the current head unit provides cellular communication functions (third generation (3G), fourth generation (4G), fifth generation (5G), and the like), and can implement information communication between people and a vehicle and between the vehicle and the outside world by using a Controller Area Network (CAN) technology of the vehicle. This improves user experience and enhances service and security related functions.

(2) Master node and slave node: Two types of nodes are distinguished in terms of logical functions, namely, a master node and a slave node. The master node is also referred to as a G node, and the slave node is also referred to as a T node. The master node manages the slave node, has a resource allocation function, and is responsible for allocating resources to the slave node. The slave node communicates, based on scheduling of the master node, with the master node by using the resources allocated by the master node. The nodes may be various apparatuses. For example, the master node is a mobile phone, the slave node is a headset. The mobile phone establishes a communication connection to the headset to implement data exchange. The mobile phone manages the headset. The mobile phone has a resource allocation function, and may allocate resources to the headset. In embodiments, the master node sends preamble information, and the slave node receives the preamble information.

(3) Communication domain: The communication domain is a system that includes a group of communication nodes that have a communication relationship, and includes a communication connection relationship between the communication nodes. One apparatus or device may be in a plurality of communication domains. For example, when a mobile phone performs wireless communication with a headset, the mobile phone is in a communication domain a including the mobile phone and the headset. In the communication domain a, the mobile phone is a master node, and the headset is a slave node. Then, after the mobile phone detects a CDC and establishes a wireless connection to the CDC, the mobile phone is also in a communication domain b including the mobile phone and the CDC. In the communication domain b, the CDC is a master node, the mobile phone is a slave node, and the mobile phone follows scheduling of the CDC. The communication domain b may further include other slave nodes such as a vehicle-mounted sound box and a microphone. In embodiments, one master node and at least one slave node form one communication domain.

(4) G link: The G link represents a communication link. A master node sends a message to a slave node by using the G link, and the slave node receives, by using the G link, the message sent by the master node.

(5) Superframe: The superframe represents a time resource unit used to transmit service data between a master node and a slave node. A length of the superframe may be specified in a protocol, and each superframe has a same length. For example, a length of the superframe may be 1 millisecond (ms).

A wireless communication scenario to which the communication method provided in embodiments is applied may include wide area wireless communication, for example, communication between a plurality of base stations and a plurality of user equipments (UEs). The base station serves as a master node, the UE serves as a slave node, the base station allocates a resource to the UE, and the UE is scheduled by the base station. The wireless communication scenario may further include an in-vehicle wireless communication scenario, for example, communication between a CDC and each of a vehicle-mounted sound box, a vehicle-mounted microphone, and a mobile phone, and communication between the mobile phone and a wearable device such as a headset. The wireless communication scenario may also include local wireless communication, for example, communication between a plurality of access points (APs) and a plurality of stations.

To facilitate understanding of the communication method in embodiments, the following specifically uses an in-vehicle wireless communication scenario as an example for description. However, a scenario to which the communication method in embodiments is applied is not limited to an in-vehicle communication scenario.

FIG. 1 is a schematic diagram of a scenario architecture of a communication method according to an embodiment.

The scenario architecture may include but is not limited to a first apparatus, a second apparatus, a third apparatus, and a fourth apparatus. The first apparatus may be a mobile phone. The second apparatus may be a CDC. There may be a plurality of third apparatuses, for example, wearable devices such as a headset and a band. There may also be a plurality of fourth apparatuses, for example, devices such as a vehicle-mounted sound box and a vehicle-mounted microphone. It can be learned from the foregoing that the first apparatus is different from the second apparatus. In some possible scenarios, types of the first apparatus and the second apparatus may be the same. For example, both the first apparatus and the second apparatus are CDCs, but the first apparatus and the second apparatus indicate different CDCs.

The second apparatus may be a device that performs control and management such as allocation and coordination on communication resources in the in-vehicle wireless communication scenario. The second apparatus establishes a communication connection to at least one fourth apparatus to form a second communication domain. The first apparatus establishes a communication connection to at least one third apparatus to form a first communication domain.

In a possible implementation, the scenario architecture in this embodiment may further include a communication domain formed by more apparatuses, for example, a fifth apparatus and a sixth apparatus. This is not limited in this disclosure.

In this embodiment, in-vehicle wireless communication is used as an example. The first apparatus represents a master node in the first communication domain, correspondingly, the third apparatus represents a slave node in the first communication domain, and data transmission is implemented between the master node and the slave node by using wireless communication. Data transmitted between the master node and the slave node includes service data, signaling, and some signals. The service data includes types such as noise reduction service data and dynamic service data. The signaling includes types such as physical layer signaling and higher layer signaling. The signals include types such as a synchronization signal and a reference signal.

Figure 2:
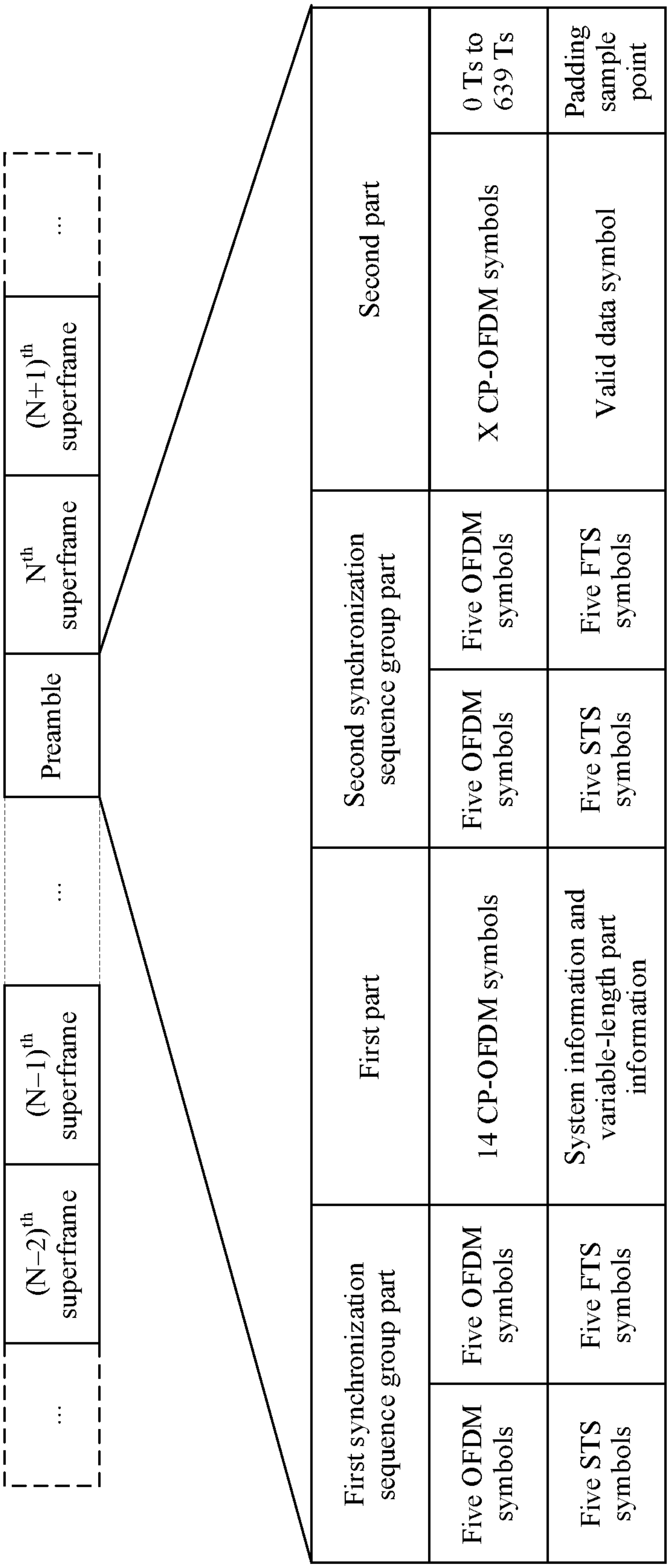
FIG. 2 is a schematic diagram of a structure of data transmission according to an embodiment.

In a vehicle-mounted short-range wireless communication system, a multi-domain resource multiplexing method in which a plurality of communication domains compete for resources is supported. Specifically, master nodes corresponding to the plurality of communication domains compete with each other to preempt a channel. The vehicle-mounted short-range communication system further supports transmission on discontinuous time resources with superframes having consecutive superframe numbers. After successfully preempting the channel, the master node performs data transmission with the slave node in at least one superframe. The master node needs to send preamble information to the slave node before the superframe. The preamble information is used by the slave node to identify a communication domain that occupies the channel, to perform synchronization, to obtain a superframe number, and to assist a slave node that does not access the communication domain in quickly obtaining system information to complete access as soon as possible. After the master node continuously uses the channel for a period of time, the master node needs to release the channel and compete for the channel again. A time for continuously using the channel is not greater than a preset time. That is, as shown in FIG. 2, after successfully preempting the channel each time, the master node needs to send preamble information to the slave node before an $N^{th}$ superframe. Therefore, the preamble information affects subsequent data transmission between the master node and the slave node.

In an example, a structure of the preamble information may be shown in FIG. 2. FIG. 2 is a schematic diagram of a structure of data transmission according to an embodiment. The preamble information sequentially includes a first synchronization sequence group part, a first part, a second synchronization sequence group part, and a second part in time domain.

Structures and functions of the foregoing parts are described in detail below.

1. The first synchronization sequence group part is the same as the second synchronization sequence group part, and each of the first synchronization sequence group part and the second synchronization sequence group part includes 10 orthogonal frequency-division multiplexing (OFDM) symbols. The 10 OFDM symbols are five second tracing signal (STS) symbols and five first tracing signal (FTS) symbols in chronological order. The first synchronization sequence group part and the second synchronization sequence group part are used to synchronize clocks of the master node and the slave node.

2. The first part may also be referred to as a fixed-length part. A length of the first part in time domain may be defined in the standard, that is, a value of the length is specified in the standard. The length of the first part in time domain may also vary with a definition in the standard. The first part carries system information and scheduling information of the second part that are transmitted by the master node to the slave node.

The first part includes 14 cyclic prefix OFDM (CP-OFDM) symbols.

The OFDM symbol includes an OFDM symbol that includes a cyclic prefix, namely, a CP-OFDM symbol, and an OFDM symbol that does not include a cyclic prefix. Time domain lengths of cyclic prefixes in different CP-OFDM symbols may be the same or different. There are a plurality of types of cyclic prefixes for CP-OFDM symbols, for example, a CP-OFDM symbol using a regular cyclic prefix and a CP-OFDM symbol using an extended cyclic prefix. A time length of the CP-OFDM symbol using the extended cyclic prefix is greater than that of the CP-OFDM symbol using the regular cyclic prefix.

In an example, the system information carried in the preamble information in the first part may be in the following form. In this embodiment, this is merely used as an example, and the system information carried in the first part is not limited.

For example, the first part may include 14 CP-OFDM symbols, and include at least one of the following information:

Version information: For example, two bits are used to indicate the version information.

G node data link layer ID: For example, 48 bits are used to indicate the G node data link layer ID.

Superframe number: For example, 16 bits are used to indicate the superframe number. For another example, the superframe number indicates a superframe number of a last superframe in previous transmission in which a channel is occupied.

Quantity of superframes included in current resource occupation: For example, four bits are used to indicate the information. For another example, a value obtained by adding 1 to a value of the domain is a quantity of superframes included in the current transmission.

Quantity of information bits for transmitting a variable-length part in a unit of bits: For example, 11 bits are used to indicate the information, and when a value of the domain is 0, the second part is not transmitted.

Modulation scheme of the second part: For example, two bits are used to indicate the information. For another example, 00 indicates quadrature phase-shift keying (QPSK), 01 indicates 16 quadrature amplitude modulation (QAM), 10 indicates 64 QAM, and 11 indicates 256 QAM.

Quantity of symbols of the second part: For example, eight bits are used to indicate the information. For another example, when a value of the domain is 0, the second part is not transmitted.

System cyclic prefix length indication information: For example, one bit is used to indicate the information. For another example, 0 indicates a regular cyclic prefix, and 1 indicates an extended cyclic prefix.

Initial radio frame symbol ratio information: For example, four bits are used to indicate the information.

Indication information of a start position of broadcast information in a superframe: For example, three bits are used to indicate the information. For another example, at a granularity of six radio frames, a number of a radio frame in which the start position of the broadcast information is located is 6× a value of the domain.

Symbol quantity information of a public resource of a control information communication domain: For example, two bits are used to indicate the information. For another example, 00 indicates four symbols, 01 indicates eight symbols, 10 indicates 12 symbols, and 11 indicates a reservation.

Broadcast information and system message change indication information: For example, one bit is used to indicate the information. For another example, 0 indicates that broadcast information and a system message do not change, and 1 indicates that the broadcast information and the system message change.

System overhead configuration period indication information: For example, one bit is used to indicate the information. For another example, 0 indicates that a configuration period is one superframe, that is, 48 radio frames, and 1 indicates that the configuration period is a half superframe, that is, 24 radio frames.

System overhead symbol quantity information: For example, four bits are used to indicate the information. For another example, when a configuration period is 48 radio frames, a configuration granularity of an overhead resource is six symbols, a quantity of overhead symbols is: (a value indicated by overhead resource information+1)×6, and four bits indicate a maximum of 96 overhead symbols. When the configuration period is 24 radio frames, the configuration granularity of the overhead resource is three symbols, the quantity of overhead symbols is: (the value indicated by the overhead resource information+1)×3, and four bits indicate a maximum of 48 overhead symbols.

3. The second part may also be referred to as a variable-length part, and the second part includes a valid data symbol part and a padding part. Length information of the second part is indicated by information carried in the first part. The valid data symbol part in the second part carries Glink-SystemInfo-Message.

The valid data symbol part in the second part includes X CP-OFDM symbols, where a value of X is determined by the system information in the first part. A start moment of the preamble information is aligned with a time length granularity of 640 Ts. A time length of the padding part is a shortest length that enables a start moment of a superframe to be aligned with a time length of 640 Ts. The time length of the padding part may alternatively be 0, and Ts is a basic time granularity in time domain.

The foregoing describes a time domain structure of the preamble information. In addition, in this embodiment, the preamble information may correspond to one or more sub-carriers in frequency domain.

Only after clock synchronization, the master node and the slave node can accurately read the system information located in the fixed-length part and the variable-length part in the preamble information, so as to implement data transmission on the superframe.

Steps of performing clock synchronization by the master node and the slave node are as follows: first, performing clock synchronization by using a first synchronization sequence group or a second synchronization sequence group, and then, to improve synchronization accuracy, performing joint synchronization by using the first synchronization sequence group and the second synchronization sequence group, to achieve clock synchronization between the master node and the slave node.

If clocks of the master node and the slave node can be successfully synchronized according to the foregoing steps, the slave node can successfully obtain the system information from the fixed-length part and the variable-length part in the preamble information, so as to access a communication domain as soon as possible, to implement data transmission with the master node.

However, in a low signal-to-noise ratio scenario, an excessively large noise or an excessively weak signal affects precision of frequency synchronization between the master node and the slave node. In other words, after clock synchronization is performed by using the first synchronization sequence group or the second synchronization sequence group, a large frequency offset still exists between the clocks of the master node and the slave node, and the frequency offset exceeds a correctable frequency offset range of the subsequent joint synchronization performed by using the first synchronization sequence group and the second synchronization sequence group. That is, even after the master node and the slave node perform clock synchronization by using the first synchronization sequence group and the second synchronization sequence group, a frequency offset still exists, and the frequency offset makes the slave node unable to correctly obtain signaling content carried in the preamble information, so that the slave node cannot access the communication domain in which the master node is located to implement data transmission with the master node. Therefore, how to obtain sufficient synchronization precision in a low signal-to-noise ratio environment, and implement data transmission between the master node and the slave node is an urgent problem to be resolved.

For ease of understanding and description, a "transmit end" is used to represent the "master node", and a "receive end" is used to represent the "slave node". It should be understood that there is no difference in essence between the two.

Figure 3:
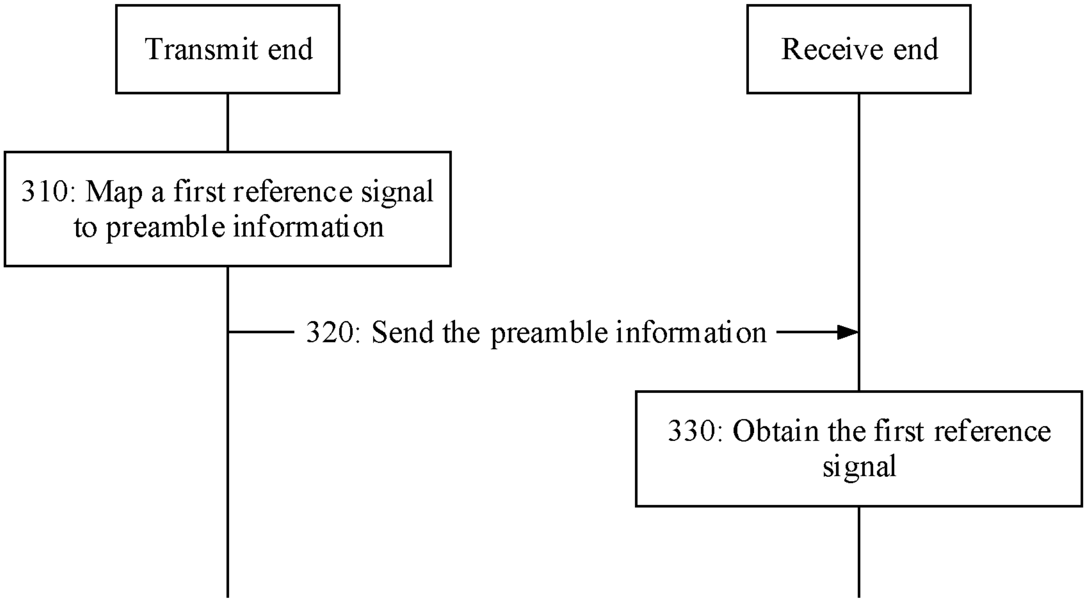
FIG. 3 is a schematic flowchart of a preamble transmission method according to an embodiment.

An embodiment provides a wireless communication method. As shown in FIG. 3, FIG. 3 is a schematic flowchart of a wireless communication transmission method according to an embodiment.

S310: Map a first reference signal to preamble information. The preamble information sequentially includes a first synchronization sequence group part, a first part, a second synchronization sequence group part, and a second part in time domain. A length of the first part in time domain is fixed. The first synchronization sequence group part, the first part, the second synchronization sequence group part, and the second part each include at least one OFDM symbol. The first reference signal is mapped to K subcarriers in subcarriers corresponding to at least one OFDM symbol included in the first part and/or the second part, where K is a positive integer.

It should be understood that the first reference signal may also be referred to as a phase adjustment reference signal, or may be another reference signal. This is not limited in this disclosure.

It should be understood that mapping the first reference signal to the preamble information indicates mapping a sequence corresponding to the first reference signal to a time-frequency resource corresponding to the first part and/or the second part.

The OFDM symbol may include an OFDM symbol that includes a cyclic prefix, that is, a CP-OFDM symbol, or may include an OFDM symbol that does not include a cyclic prefix. This is not limited in this embodiment.

For example, OFDM symbols of the first synchronization sequence group part and the second synchronization sequence group part may not include a cyclic prefix, and OFDM symbols of the first part and the second part may include a cyclic prefix.

The following separately describes in detail a mapping rule of the first reference signal on the first part and/or the second part.

It should be understood that the first reference signal is mapped to K subcarriers in subcarriers corresponding to at least one OFDM symbol included in the first part; or the first reference signal is mapped to K subcarriers in subcarriers corresponding to at least one OFDM symbol included in the second part; or the first reference signal is mapped to K subcarriers in subcarriers corresponding to at least one OFDM symbol included in the first part and the second part, where K is a positive integer.

It should be understood that the at least one OFDM symbol included in the second part represents at least one OFDM symbol included in a valid data part in the second part.

In time domain, the first reference signal may be mapped to K subcarriers in subcarriers corresponding to some OFDM symbols included in the first part and/or the second part.

Alternatively, the first reference signal may be mapped to K subcarriers in subcarriers corresponding to each OFDM symbol included in the first part and/or the second part. This is not limited in this embodiment.

Figure 4:
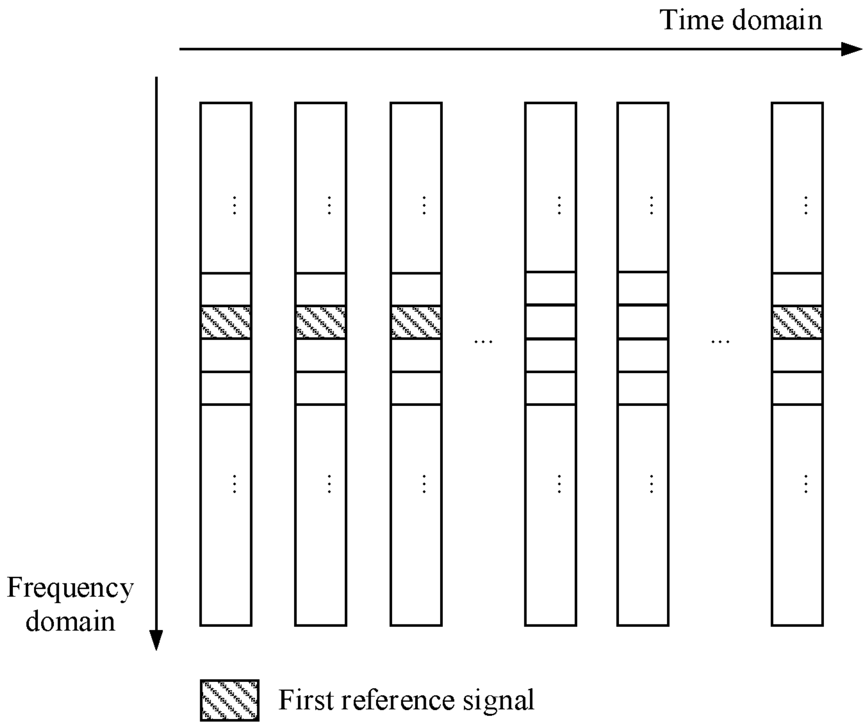
FIG. 4 is a schematic diagram of a time-frequency resource of a first part to which a first reference signal is mapped according to an embodiment.
Figure 4:
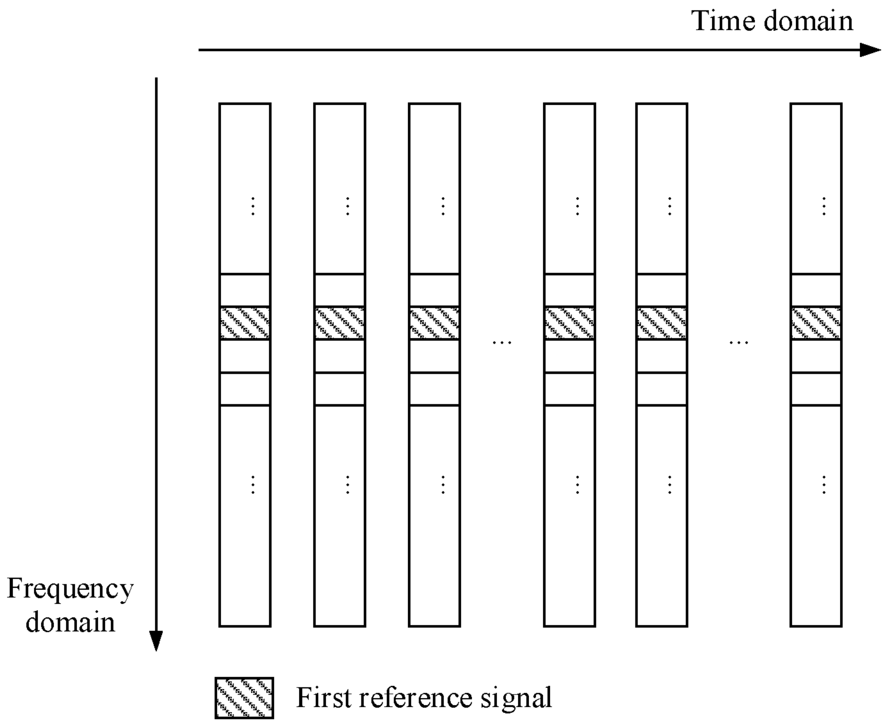

That the first reference signal is mapped to one subcarrier is used as an example. In (a) in FIG. 4, the first reference signal is mapped to one subcarrier in subcarriers corresponding to some OFDM symbols included in the first part and/or the second part. In (b) in FIG. 4, the first reference signal is mapped to one subcarrier in subcarriers corresponding to each OFDM symbol included in the first part and/or the second part.

When the first reference signal is mapped to the K subcarriers in the subcarriers corresponding to each OFDM symbol included in the first part and/or the second part, the receive end may obtain more equations used to calculate the residual frequency offset. In this way, a more accurate residual frequency offset is estimated, and sufficient synchronization precision is obtained in a low signal-to-noise ratio scenario, so that data transmission between the master node and the slave node is implemented.

In a possible implementation, the first reference signal may be mapped to K subcarriers in subcarriers corresponding to at least one CP-OFDM symbol included in the first part and/or the second part.

Because a symbol time interval of a CP-OFDM symbol is larger than a symbol time interval of an OFDM symbol that does not include a cyclic prefix, the first reference signal is mapped to the CP-OFDM symbol, so that a receive end estimates a more accurate residual frequency offset, and frequency synchronization precision is improved.

Further, in a possible implementation, the first reference signal may be mapped to K subcarriers in subcarriers corresponding to at least one CP-OFDM symbol included in the first part and/or the second part, where the CP-OFDM symbol uses an extended cyclic prefix.

Because the CP-OFDM symbol to which the first reference signal is mapped uses an extended cyclic prefix, a time length of the CP-OFDM symbol of this type is greater than that of a CP-OFDM symbol using a regular cyclic prefix. Therefore, the first reference signal is mapped to the CP-OFDM symbol using the extended cyclic prefix, so that a receive end estimates a more accurate residual frequency offset, and frequency synchronization precision is further improved.

In frequency domain, the first reference signal may be mapped to K subcarriers in subcarriers corresponding to the OFDM symbol, where K is a positive integer. A value of K may be related to at least one of the following parameters: a total quantity of subcarriers corresponding to the at least one OFDM symbol, channel quality, or a size of data carried in the first part. Positions of the K subcarriers may be related to at least one of the following parameters: a total quantity of subcarriers of the at least one OFDM symbol, channel quality, and a value of K.

When a value of K is greater than or equal to 2, each of the K subcarriers is separated by M subcarriers, where M is greater than or equal to 1. A value of M is not specifically limited in this embodiment, and the value of M may be related to at least one of the following parameters: a total quantity of subcarriers corresponding to the at least one OFDM symbol, the value of K, and a subcarrier frequency band corresponding to the at least one OFDM symbol.

Figure 5:
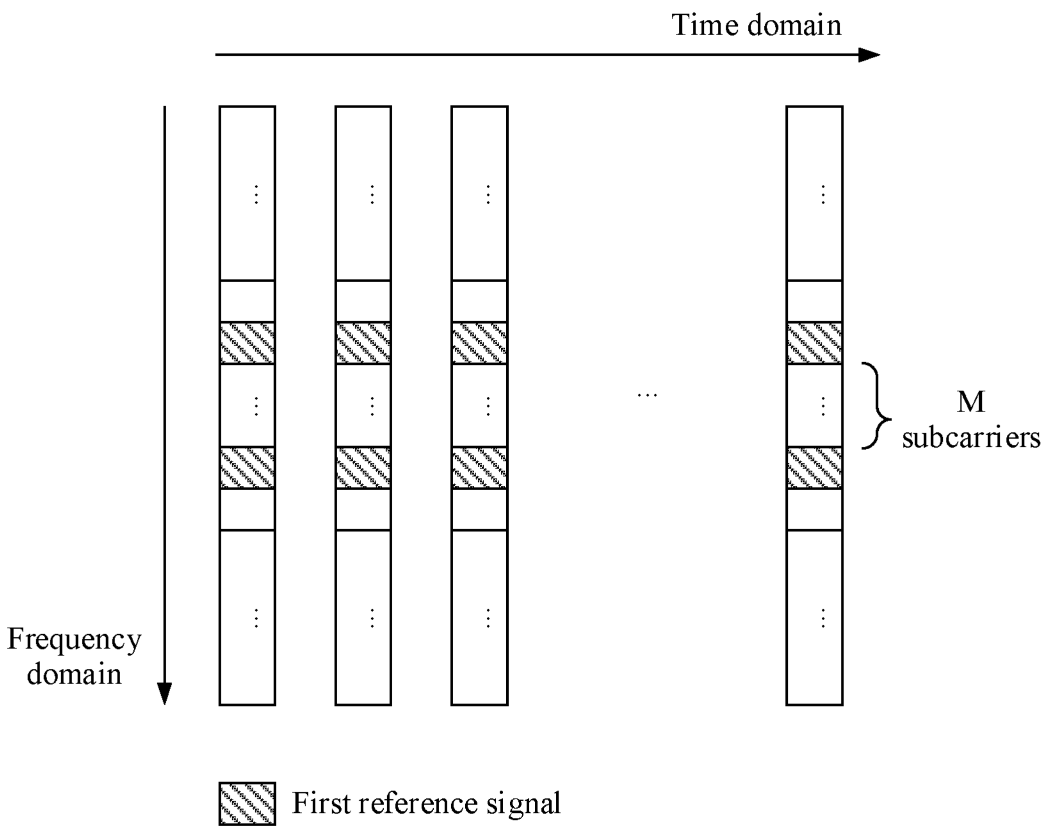
FIG. 5 is another schematic diagram of a time-frequency resource of a first part to which a first reference signal is mapped according to an embodiment.

For example, the first reference signal is mapped to K subcarriers in subcarriers corresponding to each OFDM symbol included in the first part and/or the second part. FIG. 5 is another schematic diagram of a time-frequency resource of a first part to which the first reference signal is mapped according to an embodiment.

That the first reference signal is mapped to the first part is used as an example. The first reference signal may be mapped to an $11^{th}$ subcarrier and/or a $31^{st}$ subcarrier in the subcarriers corresponding to the at least one OFDM symbol included in the first part. Alternatively, the first reference signal may be on a subcarrier at another position. This is merely an example herein. A position of a subcarrier to which the first reference signal is mapped is not limited in this embodiment. The subcarrier corresponding to the OFDM symbol may represent a subcarrier corresponding to the OFDM symbol on one carrier, or a valid subcarrier corresponding to the OFDM symbol on one carrier.

For example, a total quantity of subcarriers corresponding to the at least one OFDM symbol is 39. The first reference signal may be mapped to one subcarrier in the subcarriers corresponding to the at least one OFDM symbol. If the subcarriers corresponding to the OFDM symbol are numbered starting from 0, the first reference signal may be mapped to a subcarrier 10 or a subcarrier 30 of the at least one OFDM symbol included in the first part.

If the first reference signal may be mapped to two subcarriers in subcarriers corresponding to the at least one OFDM symbol, and if the subcarriers corresponding to the OFDM symbol are numbered starting from 0, the first reference signal may be mapped to a subcarrier 10 and a subcarrier 30 of the at least one OFDM symbol included in the first part.

If the first reference signal is mapped to the at least one OFDM symbol included in the second part, a frequency domain position of the first reference signal on the at least one OFDM symbol included in the second part is the same as a frequency domain position of the first reference signal in the first part. Details are not described herein again.

The first reference signal may be mapped to K subcarriers in subcarriers corresponding to at least one OFDM symbol included in the first part or the second part. In this case, the receive end estimates the residual frequency offset by using the first reference signal.

Alternatively, the first reference signal may be mapped to K subcarriers in subcarriers corresponding to at least one OFDM symbol included in the first part and the second part. In this case, the receive end estimates the residual frequency offset by using the first reference signal.

A position of the subcarrier to which the first reference signal is mapped is far away from a carrier edge in frequency domain, so that impact of adjacent-channel interference on the first reference signal can be reduced. In addition, when the value of K is greater than or equal to 2, and each subcarrier to which the first reference signal is mapped is separated by the M subcarriers, a frequency diversity gain may be obtained, so as to avoid poor frequency offset estimation performance because two neighboring subcarriers to which the first reference signal is mapped are located in a same deep attenuation part of a frequency domain channel.

The following describes in detail a value of a complex number that is mapped for the first reference signal.

In a possible implementation, a first synchronization sequence is mapped to at least one OFDM symbol in the first synchronization sequence group part, where the first synchronization sequence includes a first complex number, and/or a first synchronization sequence is mapped to at least one OFDM symbol in the second synchronization sequence group part, where the first synchronization sequence includes a second complex number.

It should be understood that a plurality of first synchronization sequences may be mapped to the first synchronization sequence group part, and the first synchronization sequence may include a plurality of first complex numbers. A quantity and positions of first synchronization sequences in the first synchronization sequence group part are not limited in this embodiment. A quantity and positions of the first complex numbers in the first synchronization sequence are not limited in this embodiment.

It should be understood that a plurality of first synchronization sequences may be mapped to the second synchronization sequence group part, and the first synchronization sequence may include a plurality of first complex numbers. A quantity and positions of first synchronization sequences in the first synchronization sequence group part are not limited in this embodiment. A quantity and positions of the first complex numbers in the first synchronization sequence are not limited in this embodiment.

It should be understood that the first synchronization sequence may be mapped to at least one subcarrier in the subcarriers corresponding to the at least one OFDM symbol, where the at least one subcarrier may be all subcarriers in the subcarriers corresponding to the OFDM symbol, or may be some subcarriers in the subcarriers corresponding to OFDM. This is not limited in this embodiment.

It should be understood that the first complex number and the second complex number may be mapped to an STS symbol, or may be mapped to an FTS symbol. This is not limited in this embodiment.

In a possible implementation, the first complex number is mapped to an $N^{th}$ subcarrier corresponding to the at least one OFDM symbol in the first synchronization sequence group part; and/or the second complex number is mapped to an $N^{th}$ subcarrier corresponding to the at least one OFDM symbol in the second synchronization sequence group part. A third complex number in the first reference signal is mapped to an $N^{th}$ subcarrier corresponding to the at least one OFDM symbol in the first part and/or the second part.

It should be understood that the first complex number and the third complex number are mapped to a same subcarrier, or the second complex number and the third complex number are mapped to a same subcarrier, or the first complex number, the second complex number, and the third complex number are mapped to a same subcarrier. A quantity of subcarriers to which the first complex number, the second complex number, or the third complex number is mapped is not limited in this embodiment.

The third complex number may be equal to the first complex number, or the third complex number may be equal to the second complex number, or the first complex number, the second complex number, and the third complex number may be equal. Alternatively, the third complex number may not be equal to the first complex number, or the third complex number may not be equal to the second complex number, or the first complex number, the second complex number, and the third complex number may not be equal.

When the third complex number is equal to the first complex number, or when the third complex number is equal to the second complex number, implementation complexity of calculating a residual frequency offset by a receive end can be reduced.

The first reference signal may be used to estimate a residual frequency offset after the receive end performs clock synchronization by using the first synchronization sequence group part or the second synchronization sequence group part, so as to implement phase adjustment and clock synchronization of a channel clock of the receive end. The first reference signal may be a reference signal known by the receive end.

In the technical solution of this embodiment, the first reference signal is mapped to the K subcarriers in the subcarriers corresponding to the at least one OFDM symbol included in the first part and/or the second part. A receive end calculates a residual frequency offset by using the first reference signal. In this way, channel phase adjustment and clock synchronization are implemented at the receive end, and precision of clock synchronization between a transmit end and the receive end is improved, so that data transmission between the master node and the slave node is implemented.

S320: The transmit end sends preamble information to the receive end, and the receive end receives the preamble information from the transmit end.

It should be understood that each time the transmit end obtains the channel through competition, the transmit end needs to send the preamble information to the receive end, that is, the receive end, before the superframe.

S330: The receive end obtains the first reference signal.

It should be understood that after receiving the preamble information, the receive end may obtain the first synchronization sequence group part, the second synchronization sequence group part, and the first reference signal in a demapping manner according to a mapping rule specified in a protocol, and the receive end may further obtain the first reference signal in another manner. This is not limited in this embodiment.

Optionally, the receive end performs clock synchronization based on the first synchronization sequence group part, the second synchronization sequence group part, and the first reference signal.

Figure 6:
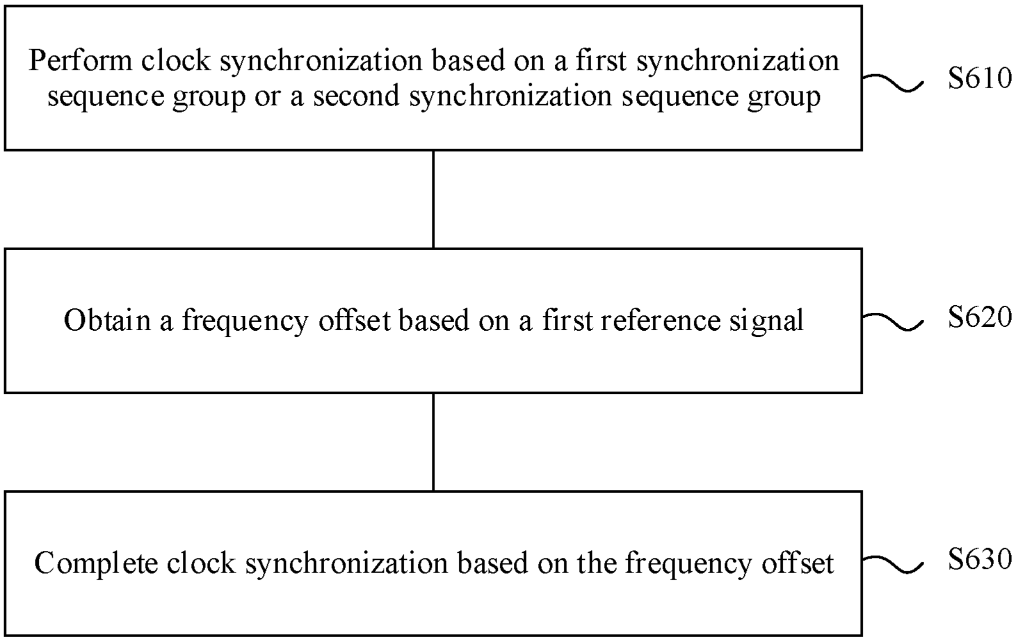
FIG. 6 is a schematic flowchart of steps of clock synchronization between a transmit end and a receive end according to an embodiment.

The following describes, with reference to FIG. 6, specific steps of clock synchronization performed by the receive end. FIG. 6 is a schematic flowchart of steps of clock synchronization between a transmit end and a receive end according to an embodiment.

S610: The receive end performs clock synchronization based on the first synchronization sequence group part or the second synchronization sequence group part.

It should be understood that, in a low signal-to-noise ratio scenario, because the noise is excessively large or the signal is excessively weak, when clock synchronization between the transmit end and the receive end is performed by using the first synchronization sequence group part or the second synchronization sequence group part, the generated residual frequency offset exceeds a frequency offset range of joint synchronization performed by using the first synchronization sequence group part and the second synchronization sequence group part.

S620: The receive end obtains the residual frequency offset based on the first reference signal.

In a possible implementation, the receive end obtains the residual frequency offset through calculation based on the third complex number, that is, the first reference signal, received on the $N^{th}$ subcarrier in the subcarriers corresponding to the at least one OFDM symbol in the first part, and the first complex number received on the $N^{th}$ subcarrier in the first synchronization sequence group part.

Specifically, when the first complex number mapped by the transmit end is equal to the third complex number, it is assumed that the residual frequency offset generated by the receive end after step S610 is df.

If the first complex number of the transmit end is mapped to an $N^{th}$ subcarrier in subcarriers corresponding to a last FTS symbol in the first synchronization sequence group part, the third complex number A(N,l) received by the receive end on an $N^{th}$ subcarrier of an $l^{th}$ CP-OFDM symbol in the first part meets a formula (1).

$$A(N, l) = A(N)e^{j \cdot 2\pi \cdot df \cdot dt \cdot l} + n \qquad (1)$$

Herein, A(N) represents the first complex number received by the receive end on the $N^{th}$ subcarrier in the subcarriers corresponding to the last FTS symbol in the first synchronization sequence group part, n represents random noise, dt represents a symbol spacing, and l=1, 2, 3, 4, . . . , 14.

It should be understood that the first part includes 14 CP-OFDM symbols, and third complex numbers A(N,l) received by the receive end on $N^{th}$ subcarriers on all CP-OFDM symbols meet the formula (1). Therefore, an equation is obtained for a third complex number received on each CP-OFDM symbol, and a plurality of equations may be used simultaneously to estimate the residual frequency offset df.

It should be understood that in the foregoing example, the receive end receives the first complex number on the $N^{th}$ subcarrier in the subcarriers corresponding to the last FTS symbol in the first synchronization sequence group part. The transmit end may map the first complex number on at least one OFDM symbol in the first synchronization sequence group part. This is merely an example herein. When the transmit end maps the first complex number on another OFDM symbol, the formula (1) may be adjusted to estimate the residual frequency offset. This is not listed one by one in this embodiment. In addition, the formula (1) is only one manner of estimating the residual frequency offset, and there may be a manner of estimating the residual frequency offset by using the third complex number. This is not limited in this disclosure.

In a possible implementation, when the second complex number mapped by the transmit end is equal to the third complex number, the receive end obtains the residual frequency offset through calculation based on the third complex number, that is, the first reference signal, received on the $N^{th}$ subcarrier in the subcarriers corresponding to the at least one OFDM symbol included in the second part, and the second complex number received on an $N^{th}$ subcarrier in subcarriers corresponding to a last FTS symbol in the second synchronization sequence group part. A specific manner of calculating the residual frequency offset is the same as the foregoing manner of calculating the residual frequency offset. Details are not described herein again.

In the technical solution of this embodiment, a transmit end maps the first reference signal to the subcarrier corresponding to the at least one OFDM symbol included in the first part or the second part in the preamble information, so that a receive end can estimate, in a low signal-to-noise ratio scenario, a residual frequency offset after the transmit end and the receive end perform clock synchronization by using the first synchronization sequence group part or the second synchronization sequence group part, so as to improve frequency synchronization precision during clock synchronization between the transmit end and the receive end, so that in the low signal-to-noise ratio scenario, sufficient synchronization precision is obtained, the slave node reads signaling content carried in the preamble information, and data transmission between the master node and the slave node is implemented.

In a possible implementation, the residual frequency offset df is estimated based on equations combined with the third complex number received by the receive end in the first part and the first complex number received in the first synchronization sequence group part, and the third complex number received in the second part and the second complex number received in the second synchronization sequence group part. A specific manner of calculating the residual frequency offset is the same as the foregoing manner of calculating the residual frequency offset. Details are not described herein again.

A larger quantity of equations combined with the third complex number and the first complex number, and the third complex number and the second complex number indicates a larger quantity of equations used for estimating the residual frequency offset, so that residual frequency offset estimation precision can be further improved. In this way, frequency synchronization precision is improved during clock synchronization between the transmit end and the receive end, so that sufficient synchronization precision is obtained in the low signal-to-noise ratio scenario, the slave node reads signaling content carried in the preamble information, and data transmission between the master node and the slave node is implemented.

In a possible implementation, when the transmit end maps the first reference signal to K subcarriers in subcarriers corresponding to at least one OFDM symbol included in the first part and/or the second part, and a value of K is greater than or equal to 2, the receive end estimates the residual frequency offset based on the first complex number and the third complex number, or the second complex number and the third complex number, or the first complex number, the second complex number, and the third complex number that are received on the $N^{th}$ subcarrier.

When the first reference signal is mapped to the K subcarriers, and a value of K is greater than or equal to 2, more residual frequency offset estimation equations are obtained, so that residual frequency offset estimation precision can be further improved. In this way, frequency synchronization precision is improved during clock synchronization between the transmit end and the receive end, so that sufficient synchronization precision is obtained in a low signal-to-noise ratio scenario, the slave node reads signaling content carried in the preamble information, and data transmission between the master node and the slave node is implemented.

If the first complex number mapped by the transmit end is not equal to the third complex number, it is assumed that the residual frequency offset generated by the receive end after step S610 is df.

If the first complex number is mapped by the transmit end to an $N^{th}$ subcarrier in subcarriers corresponding to a last FTS symbol in the first synchronization sequence group part, the residual frequency offset df is estimated according to a formula (2).

$$B(N, l) = B(N)e^{j\cdot 2\pi\cdot df\cdot dt\cdot l} + n \tag{2}$$

Herein, $$B(N, l) = \frac{A(N, l)}{A'(N, l)}, \text{ and } B(N) = \frac{A(N)}{A'(N)}.$$

A(N) represents the first complex number received by the receive end on the $N^{th}$ subcarrier in the subcarriers corresponding to the last FTS symbol in the first synchronization sequence group part. A'(N) represents the first complex number that is known by the receive end and that is mapped by the transmit end to the $N^{th}$ subcarrier in the subcarriers corresponding to the last FTS symbol in the first synchronization sequence group part. A(N,l) represents a third complex number received by the receive end on an $N^{th}$ subcarrier of an $l^{th}$ CP-OFDM symbol in the first part. A'(N,l) represents a third complex number that is known by the receive end and that is mapped by the transmit end to the $N^{th}$ subcarrier of the $l^{th}$ CP-OFDM symbol in the first part. n represents random noise. dt represents a symbol spacing. l=1, 2, 3, 4, . . . , 14.

It should be understood that the first part includes 14 CP-OFDM symbols. The receive end obtains, on each CP-OFDM symbol, one equation for estimating the residual frequency offset, and a plurality of equations may be used simultaneously to estimate the residual frequency offset df.

When the first complex number is not equal to the third complex number, implementation complexity of estimating the residual frequency offset increases. Therefore, when the first complex number is equal to the third complex number, a relationship between different signals can be simplified, and implementation complexity of estimating the residual frequency offset can be reduced.

S630: The receive end completes clock synchronization between the receive end and the transmit end based on the estimated residual frequency offset.

In a possible implementation, the receive end compensates, based on the estimated residual frequency offset, a frequency of the receive end after step S610, so that the residual frequency offset falls within a frequency offset range of joint synchronization performed by using the first synchronization sequence group part and the second synchronization sequence group part.

Further, joint synchronization is performed on the clocks of the receive end and the transmit end by using the first synchronization sequence group part and the second synchronization sequence group part, so as to complete clock synchronization between the receive end and the transmit end.

According to the technical solution, frequency synchronization precision is improved during clock synchronization between the transmit end and the receive end, so that sufficient synchronization precision is obtained in a low signal-to-noise ratio scenario, preamble information is obtained, and data transmission between the master node and the slave node is implemented.

Figure 7:
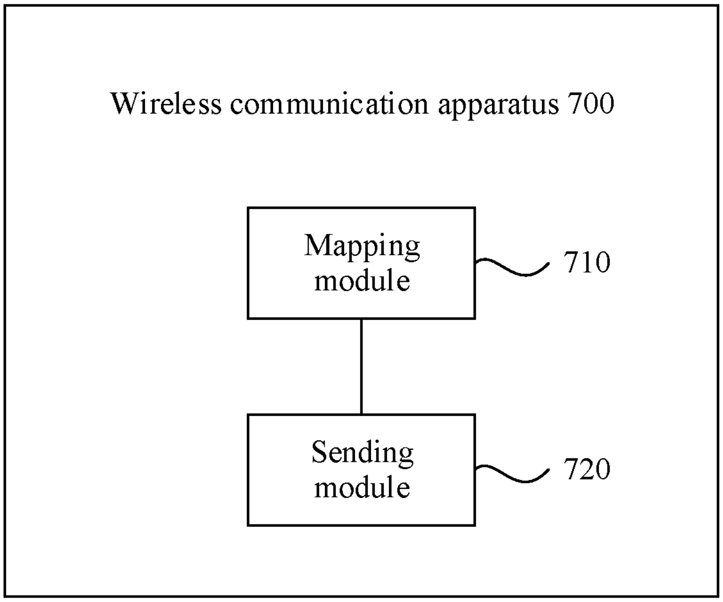
FIG. 7 is a schematic block diagram of a wireless communication apparatus according to an embodiment.
Figure 8:
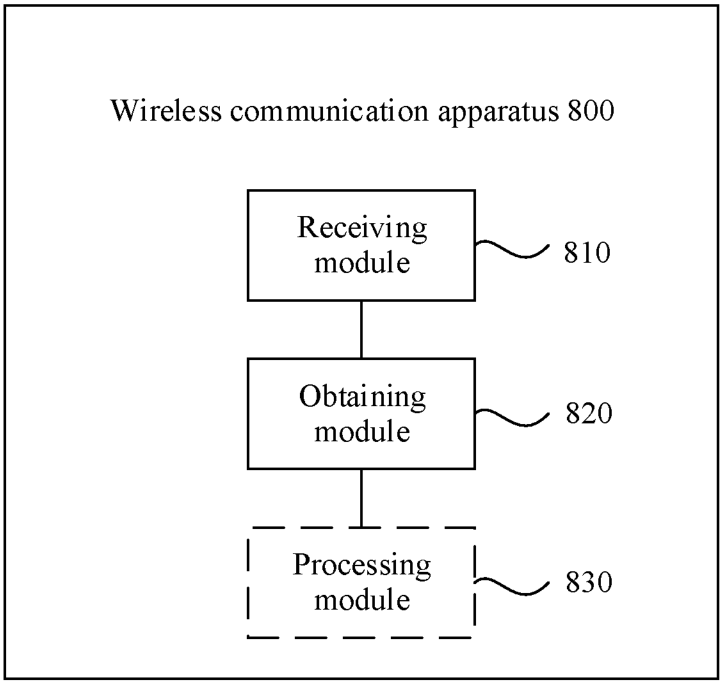
FIG. 8 is a schematic block diagram of another wireless communication apparatus according to an embodiment.
Figure 9:
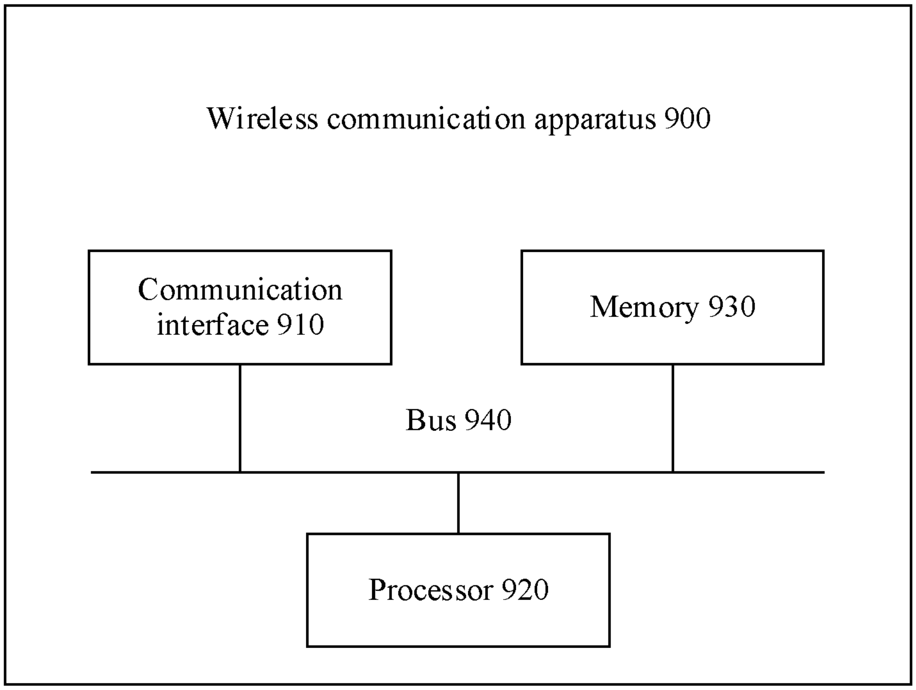
FIG. 9 is a schematic block diagram of still another wireless communication apparatus according to an embodiment.

The foregoing describes in detail the wireless communication method embodiments with reference to FIG. 1 to FIG. 6, and the following describes apparatus embodiments with reference to FIG. 7 to FIG. 9. For detailed description, refer to the foregoing method embodiments.

FIG. 7 is a schematic block diagram of a wireless communication apparatus according to an embodiment. The wireless communication apparatus in FIG. 7 may be configured to implement corresponding functions in the foregoing embodiments of FIG. 1 to FIG. 5 of the transmit end. To avoid repetition, details are not described again. The wireless communication apparatus in FIG. 7 may include a mapping module 710 and a sending module 720.

The mapping module 710 is configured to map a first reference signal to preamble information, where the preamble information sequentially includes a first synchronization sequence group part, a first part, a second synchronization sequence group part, and a second part in time domain, a length of the first part in time domain is fixed, the first synchronization sequence group part, the first part, the second synchronization sequence group part, and the second part each include at least one orthogonal frequency division multiplexing OFDM symbol, and the first reference signal is mapped to K subcarriers in subcarriers corresponding to at least one OFDM symbol included in the first part and/or the second part, where K is a positive integer; and the sending module is configured to send the preamble information.

Optionally, in an embodiment, the mapping module 710 is configured to map the first reference signal to an $11^{th}$ subcarrier and/or a $31^{st}$ subcarrier in the subcarriers corresponding to the at least one OFDM symbol included in the first part; and/or map the first reference signal to an $11^{th}$ subcarrier and/or a $31^{st}$ subcarrier in the subcarriers corresponding to the at least one OFDM symbol included in the second part.

Optionally, in an embodiment, the mapping module 710 is configured to map a first synchronization sequence to at least one OFDM symbol in the first synchronization sequence group part, where the first synchronization sequence includes a first complex number, and/or map a first synchronization sequence to at least one OFDM symbol in the second synchronization sequence group part, where the first synchronization sequence includes a second complex number.

Optionally, in an embodiment, the first complex number is mapped to an $N^{th}$ subcarrier corresponding to the at least one OFDM symbol in the first synchronization sequence group part; the second complex number is mapped to an $N^{th}$ subcarrier corresponding to the at least one OFDM symbol in the second synchronization sequence group part; and/or the first reference signal includes a third complex number, and the third complex number is mapped to an $N^{th}$ subcarrier corresponding to the at least one OFDM symbol in the first part and/or the second part. The third complex number is equal to the first complex number, or the third complex number is equal to the second complex number, or the first complex number, the second complex number, and the third complex number are equal.

Optionally, in an embodiment, the first reference signal is mapped to the K subcarriers in subcarriers corresponding to each OFDM symbol included in the first part and/or the second part, where K is a positive integer.

Optionally, in an embodiment, a length of the second part in time domain is variable.

Optionally, in an embodiment, the first part indicates length information of the second part.

FIG. 8 is a schematic block diagram of another wireless communication apparatus according to an embodiment. The wireless communication apparatus in FIG. 8 may be configured to implement corresponding functions in the foregoing embodiments of the receive end in FIG. 6. To avoid repetition, details are not described again. The wireless communication apparatus in FIG. 8 may include a receiving module 810 and an obtaining module 820.

The receiving module 810 is configured to receive preamble information, where the preamble information sequentially includes a first synchronization sequence group part, a first part, a second synchronization sequence group part, and a second part in time domain, a length of the first part in time domain is fixed, the first synchronization sequence group part, the first part, the second synchronization sequence group part, and the second part each include at least one OFDM symbol, and the first reference signal is mapped to K subcarriers in subcarriers corresponding to at least one OFDM symbol included in the first part and/or the second part, where K is a positive integer. The obtaining module 820 is configured to obtain the first reference signal.

Optionally, in an embodiment, the first reference signal is mapped to an $11^{th}$ subcarrier and/or a $31^{st}$ subcarrier of the at least one OFDM symbol included in the first part; and/or the first reference signal is mapped to an $11^{th}$ subcarrier and/or a $31^{st}$ subcarrier of the at least one OFDM symbol included in the second part.

Optionally, in an embodiment, the obtaining module 820 is further configured to obtain a first synchronization sequence, where the first synchronization sequence is mapped to at least one OFDM symbol in the first synchronization sequence group part, and the first synchronization sequence includes a first complex number; and/or the first synchronization sequence is mapped to at least one OFDM symbol in the second synchronization sequence group part, and the first synchronization sequence includes a second complex number.

Optionally, in an embodiment, the first complex number is mapped to an $N^{th}$ subcarrier corresponding to the at least one OFDM symbol in the first synchronization sequence group part; the second complex number is mapped to an $N^{th}$ subcarrier corresponding to the at least one OFDM symbol in the second synchronization sequence group part; and/or the first reference signal includes a third complex number, and the third complex number is mapped to an $N^{th}$ subcarrier corresponding to the at least one OFDM symbol in the first part and/or the second part. The third complex number is equal to the first complex number, or the third complex number is equal to the second complex number, or the first complex number, the second complex number, and the third complex number are equal.

Optionally, in an embodiment, the first reference signal is mapped to the K subcarriers in subcarriers corresponding to each OFDM symbol included in the first part and/or the second part, where K is a positive integer.

Optionally, in an embodiment, a length of the second part in time domain is variable.

Optionally, in an embodiment, the first part indicates length information of the second part.

Optionally, in an embodiment, the wireless communication apparatus may further include a processing module 830. The processing module 830 is configured to perform synchronization based on the first synchronization sequence group part or the second synchronization sequence group part.

Optionally, in an embodiment, a first synchronization sequence is mapped to at least one OFDM symbol in the first synchronization sequence group part, where the first synchronization sequence includes a first complex number; and/or a first synchronization sequence is mapped to at least one OFDM symbol in the second synchronization sequence group part, where the first synchronization sequence includes a second complex number. The first reference signal includes a third complex number, and the third complex number is mapped to an $N^{th}$ subcarrier corresponding to the at least one OFDM symbol in the first part and/or the second part. The processing module 830 is further configured to: perform synchronization based on the first complex number and the third complex number; or perform synchronization based on the second complex number and the third complex number; or perform synchronization based on the first complex number, the second complex number, and the third complex number.

In an optional embodiment, FIG. 9 is a schematic block diagram of still another wireless communication apparatus according to an embodiment. When the wireless communication apparatus 900 represents a wireless communication apparatus at a transmit end, the mapping module 710 in FIG. 7 may be the processor 920 in FIG. 9, and the sending module 720 in FIG. 7 may be the communication interface 910 in FIG. 9. The detail is shown in FIG. 9.

When the wireless communication apparatus 900 represents a wireless communication apparatus at a receive end, the receiving module 810 in FIG. 8 may be the communication interface 910 in FIG. 9, and the obtaining module 820 and the processing module 830 in FIG. 8 may be the processor 920 in FIG. 9, as shown in FIG. 9.

The wireless communication apparatus shown in FIG. 9 may include a communication interface 910, a processor 920, a memory 930, and a bus 940. The communication interface 910, the processor 920, and the memory 930 are connected by using the bus 940. The memory 930 is configured to store instructions. The processor 920 is configured to execute the instructions stored in the memory 930.

The communication interface 910 is configured to send and receive information. Optionally, the memory 930 may be coupled to the processor 920 by using an interface, or may be integrated with the processor 920.

In an implementation process, the steps in the foregoing method may be implemented by using an integrated logic circuit of hardware in the processor 920 or a software-form instruction. The method disclosed with reference to embodiments may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, or a register. The storage medium is located in the memory 930. The processor 920 reads information in the memory 930, and implements the steps of the foregoing methods in combination with hardware of the processor 920. To avoid repetition, details are not described herein again.

It should be understood that in this embodiment the memory may include a read-only memory and a random access memory, and provide instructions and data to the processor. A part of the processor may further include a non-volatile random access memory. For example, the processor may further store information of a device type.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments. The execution sequences of the processes should be determined according to functions and internal logic of the processes, and should not be construed as any limitation on the implementation processes of embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments. The foregoing storage medium includes any medium that can store program code, such as a Universal Serial Bus (USB) drive, a removable hard disk, a read-only memory (ROM), a random-access memory (RAM), a magnetic disk, or an optical disc.

The foregoing descriptions are merely specific implementations, but are not intended to limit the protection scope of this disclosure. Any variation or replacement readily figured out by a person skilled in the art within the technical scope disclosed shall fall within the protection scope of this disclosure. Therefore, the protection scope of this disclosure shall be subject to the protection scope of the claims.

What is claimed is:

1. A method comprising:

mapping a reference signal to preamble information, wherein the preamble information sequentially comprises a first synchronization sequence group part, a first part, a second synchronization sequence group part, and a second part in a time domain, wherein a first length of the first part is fixed, wherein the first part and the second part comprise first orthogonal frequency-division multiplexing (OFDM) symbols, wherein the first synchronization sequence group part and the second synchronization sequence group part each comprise 10 second OFDM symbols, wherein the 10 second OFDM symbols comprise 5 second tracing signal symbols and 5 first tracing signal symbols in chronological order, wherein the reference signal is mapped to K subcarriers in subcarriers corresponding to at least one of the OFDM symbols in the first part or the second part, and wherein K is a positive integer; and sending the preamble information.

2. The method of claim 1, wherein the reference signal is mapped to an $11^{th}$ subcarrier or a $31^{st}$ subcarrier in the subcarriers.

3. The method of claim 1, further comprising mapping a synchronization sequence to at least one of the OFDM symbols in the first synchronization sequence group part, wherein the synchronization sequence comprises a first complex number.

4. The method of claim 3, wherein the first complex number is mapped to an $N^{th}$ subcarrier corresponding to the at least one of the OFDM symbols in the first synchronization sequence group part or the second synchronization sequence group part, wherein the reference signal comprises a third complex number that is mapped to the $N^{th}$ subcarrier, and wherein the third complex number is equal to the first complex number, the third complex number is equal to a second complex number in the synchronization sequence, or the first complex number, the second complex number, and the third complex number are equal.

5. The method of claim 1, wherein the subcarriers correspond to each of the OFDM symbols in the first part or the second part.

6. The method of claim 1, wherein a second length of the second part in the time domain is variable.

7. The method of claim 1, wherein the first part indicates length information of the second part.

8. A method comprising:

receiving preamble information sequentially comprising a first synchronization sequence group part, a first part, a second synchronization sequence group part, and a second part in a time domain, wherein a first length of the first part is fixed, wherein the first part and the second part comprise first orthogonal frequency-division multiplexing (OFDM) symbols, wherein the first synchronization sequence group part and the second synchronization sequence group part each comprise 10 second OFDM symbols, wherein the 10 second OFDM symbols comprise 5 second tracing signal symbols and 5 first tracing signal symbols in chronological order, wherein a reference signal is mapped to K subcarriers in subcarriers corresponding to at least one of the OFDM symbols in the first part or the second part, and wherein K is a positive integer; and demapping the reference signal from the preamble information.

9. The method of claim 8, wherein the reference signal is mapped to an $11^{th}$ subcarrier or a $31^{st}$ subcarrier in the subcarriers.

10. The method of claim 8, further comprising:

demapping a synchronization sequence from at least one of the OFDM symbols in the first synchronization sequence group part, wherein the synchronization sequence comprises a first complex number; or demapping the synchronization sequence from at least one of the OFDM symbols in the second synchronization sequence group part, wherein the synchronization sequence comprises a second complex number.

11. The method of claim 10, wherein the first complex number is mapped to an $N^{th}$ subcarrier corresponding to the at least one of the OFDM symbols in the first synchronization sequence group part or the second synchronization sequence group part, wherein the reference signal comprises a third complex number that is mapped to the $N^{th}$ subcarrier, and wherein the third complex number is equal to the first complex number, the third complex number is equal to the second complex number, or the first complex number, the second complex number, and the third complex number are equal.

12. The method of claim 8, wherein the subcarriers correspond to each of the OFDM symbols in the first part or the second part.

13. The method of claim 8, wherein a second length of the second part is variable.

14. An apparatus comprising:

one or more memories configured to store programming instructions; and at least one processor coupled to the one or more memories and configured to execute the programming instructions to cause the apparatus to:

map a reference signal to preamble information, wherein the preamble information sequentially comprises a first synchronization sequence group part, a first part, a second synchronization sequence group part, and a second part in a time domain, wherein a first length of the first part is fixed, wherein the first part and the second part comprise first orthogonal frequency-division multiplexing (OFDM) symbols, wherein the first synchronization sequence group part and the second synchronization sequence group part each comprise 10 second OFDM symbols, wherein the 10 second OFDM symbols comprise 5 second tracing signal symbols and 5 first tracing signal symbols in chronological order, wherein the reference signal is mapped to K subcarriers in subcarriers corresponding to at least one of the OFDM symbols in the first part or the second part, and wherein K is a positive integer; and send the preamble information.

15. The apparatus of claim 14, wherein the reference signal is mapped to an $11^{th}$ subcarrier or a $31^{st}$ subcarrier in the subcarriers.

16. The apparatus of claim 14, wherein the at least one processor is further configured to execute the programming instructions to cause the apparatus to map a synchronization sequence to at least one of the OFDM symbols in the second synchronization sequence group part, wherein the synchronization sequence comprises a second complex number.

17. The apparatus of claim 16, wherein a first complex number in the synchronization sequence is mapped to an $N^{th}$ subcarrier corresponding to the at least one of the OFDM symbols in the first synchronization sequence group part or the second synchronization sequence group part, wherein the reference signal comprises a third complex number that is mapped to the $N^{th}$ subcarrier corresponding to the at least one of the OFDM symbols in the first part or the second part, and wherein the third complex number is equal to the first complex number, the third complex number is equal to the second complex number, or the first complex number, the second complex number, and the third complex number are equal.

18. The apparatus of claim 14, wherein the subcarriers correspond to each of the OFDM symbols in the first part or the second part.

19. The apparatus of claim 14, wherein a second length of the second part is variable.

20. The apparatus of claim 14, wherein the first part indicates length information of the second part.

* * * * *